US012325488B2

(12) United States Patent
Mercat et al.

(10) Patent No.: US 12,325,488 B2
(45) Date of Patent: Jun. 10, 2025

(54) ELECTRIC ASSIST DEVICE FOR A BICYCLE

(71) Applicant: MAVIC GROUP, Chavanod (FR)

(72) Inventors: Jean-Pierre Mercat, Chavanod (FR); Bérenger Alexandre, Pringy (FR); François-Xavier Huat, Annecy (FR); Jérôme Fantin, Seynod (FR)

(73) Assignee: MAVIC GROUP, Chavanod (FR)

( * ) Notice: Subject to any disclaimer, the term of this patent is extended or adjusted under 35 U.S.C. 154(b) by 936 days.

(21) Appl. No.: 17/421,151

(22) PCT Filed: Jan. 8, 2020

(86) PCT No.: PCT/FR2020/000004
§ 371 (c)(1),
(2) Date: Jul. 7, 2021

(87) PCT Pub. No.: WO2020/144419
PCT Pub. Date: Jul. 16, 2020

(65) Prior Publication Data
US 2022/0081063 A1    Mar. 17, 2022

(30) Foreign Application Priority Data
Jan. 8, 2019  (FR) ..................................... 1900166

(51) Int. Cl.
*B62M 6/55* (2010.01)
*B62M 11/14* (2006.01)

(52) U.S. Cl.
CPC .............. *B62M 6/55* (2013.01); *B62M 11/14* (2013.01)

(58) Field of Classification Search
CPC .......... B62M 6/55; B62M 6/50; B62M 11/14; B62M 11/145
(Continued)

(56) References Cited

U.S. PATENT DOCUMENTS 6,296,072 B1 * 10/2001 Turner ................... B62K 19/48
180/65.6
7,059,989 B2 * 6/2006 Fukui ........................ B62J 6/10
290/1 R
(Continued)

FOREIGN PATENT DOCUMENTS

CN    2240486 Y    11/1996
CN    1167064 A    12/1997
(Continued)

OTHER PUBLICATIONS

DE102018217096 English translation (Year: 2020).*
(Continued)

*Primary Examiner* — Anne Marie M Boehler
(74) *Attorney, Agent, or Firm* — Oblon, McClelland, Maier & Neustadt, L.L.P.

(57) ABSTRACT

An assist device for a bicycle includes a motor, a step-down gear, a free wheel, and a shaft which rotates as one with a right crank and a left crank. The motor transmits an assist torque to the shaft by m the free wheel. The device is designed to be received inside a pedal assembly casing. The shaft is rotatably mounted relative to the casing by two ball bearings. The free wheel includes a plurality of pieces which are placed between the motor and the shaft. The device also includes a torque transmission ring which allows one of the pieces of the free wheel to be secured to the shaft or to one of the cranks. The transmission ring is at least partially placed under one of the two ball bearings.

10 Claims, 12 Drawing Sheets

(58) Field of Classification Search
USPC .................................................. 180/206.4
See application file for complete search history.

(56) References Cited

U.S. PATENT DOCUMENTS

| | | | | |
|---|---|---|---|---|
| 10,308,314 | B2* | 6/2019 | Gao | ........................ G01L 3/108 |
| 11,286,979 | B2* | 3/2022 | Rossberger | .............. B62M 6/50 |
| 2019/0331203 | A1* | 10/2019 | Mei | ........................ B62M 6/55 |
| 2022/0001956 | A1* | 1/2022 | Mercat | .................... F16D 43/22 |

FOREIGN PATENT DOCUMENTS

| | | | |
|---|---|---|---|
| CN | 201161693 Y | | 12/2008 |
| CN | 201390358 Y | | 1/2010 |
| CN | 102753429 A | | 10/2012 |
| CN | 105939924 A | | 9/2016 |
| DE | 102018217096 A1 | * | 4/2020 |
| EP | 0 743 238 A1 | | 11/1996 |
| EP | 2 522 567 A1 | | 11/2012 |
| GB | 2 312 403 A | | 10/1997 |
| WO | WO 2010/051681 A1 | | 5/2010 |

OTHER PUBLICATIONS

Combined Chinese Office Action and Search Report issued Jul. 22, 2022 in Chinese Patent Application No. 202080019058.4 (with English Translation of Office Action only), 8 pages.
Combined Chinese Office Action and Search Report issued Jan. 18, 2023, in Chinese Patent Application No. 202080019058.4 (with partial English translation and English Translation of Category of Cited Documents), 8 pages.
Office Action issued May 25, 2023, in corresponding Chinese Patent Application No. 202080019058.4 (with English Translation), 7 pages.
International Search Report issued on Apr. 22, 2020 in PCT/FR2020/000004 filed on Jan. 8, 2020, 2 pages.

* cited by examiner

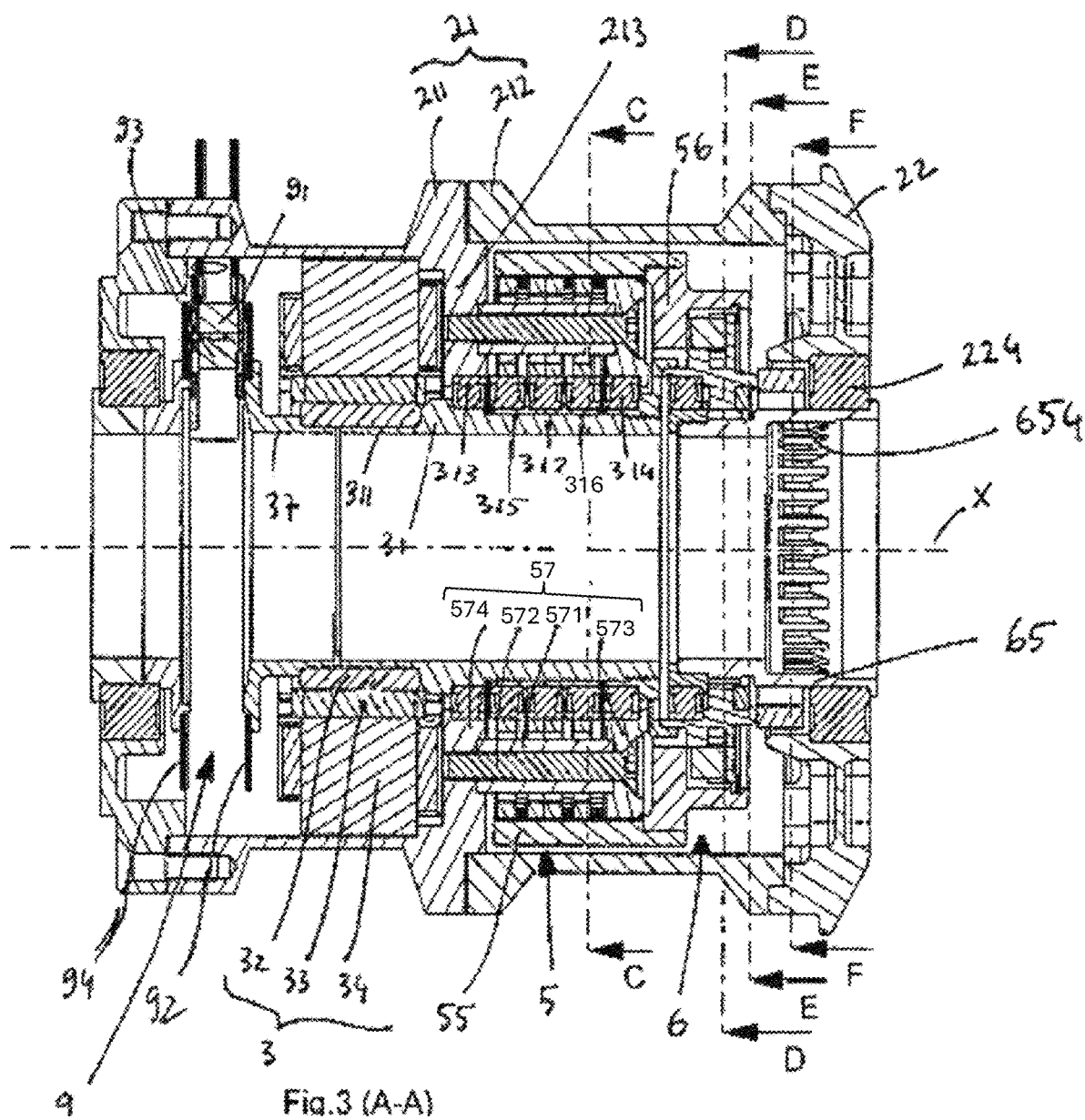
Fig.3 (A-A)

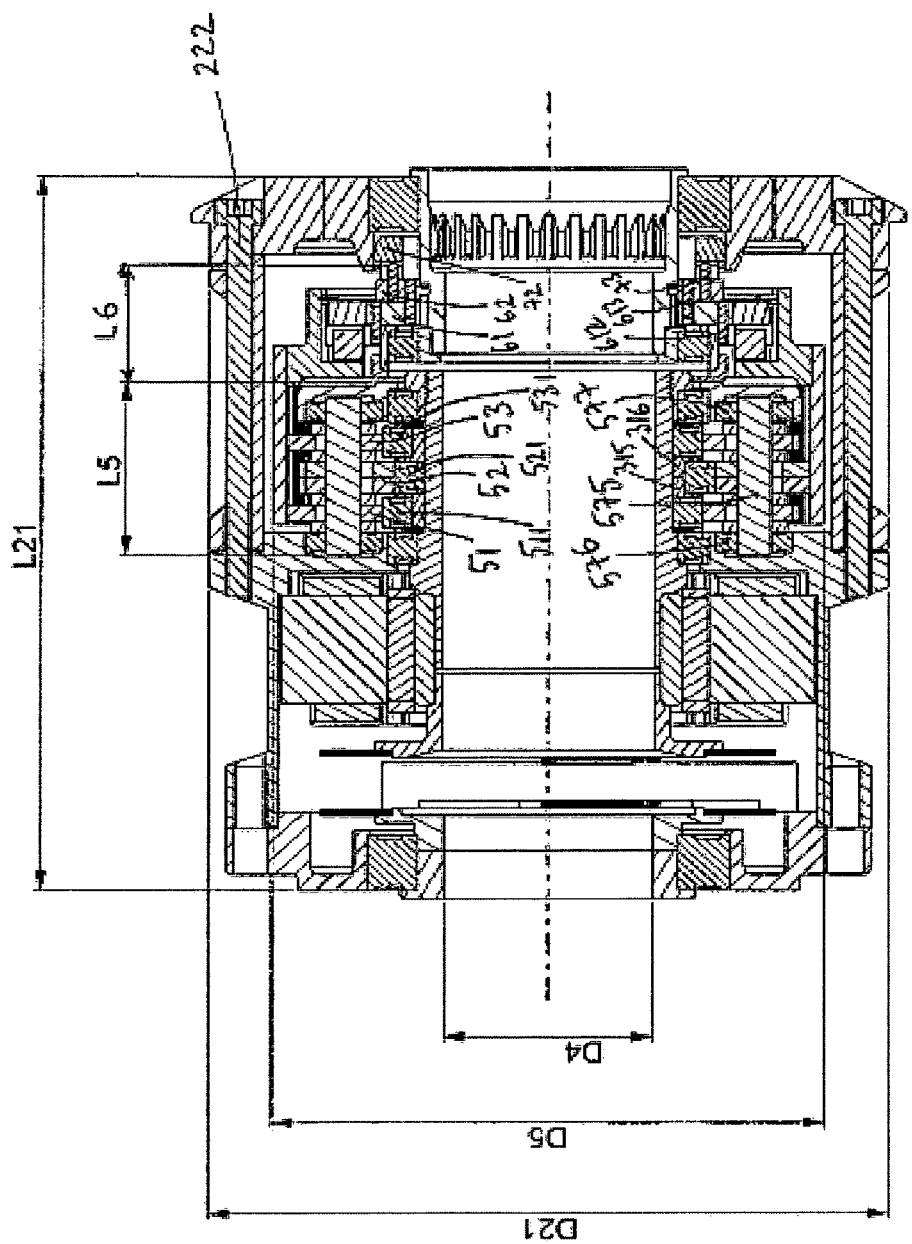
Fig.4 (B-B)

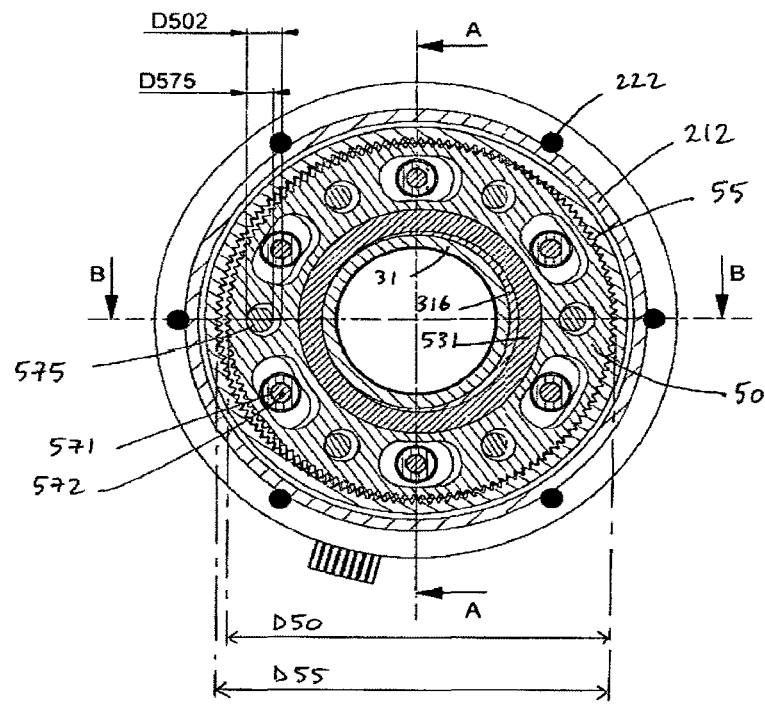
Fig.6 (C-C)
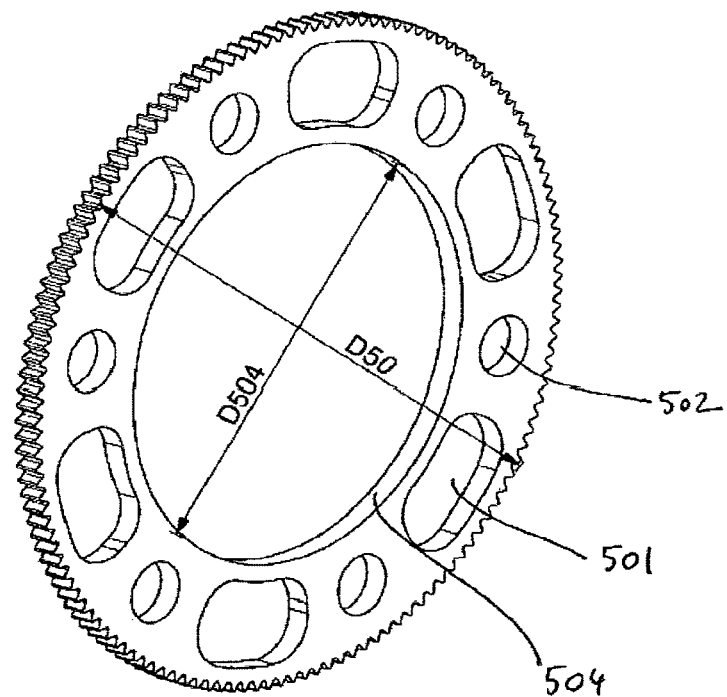
Fig.7

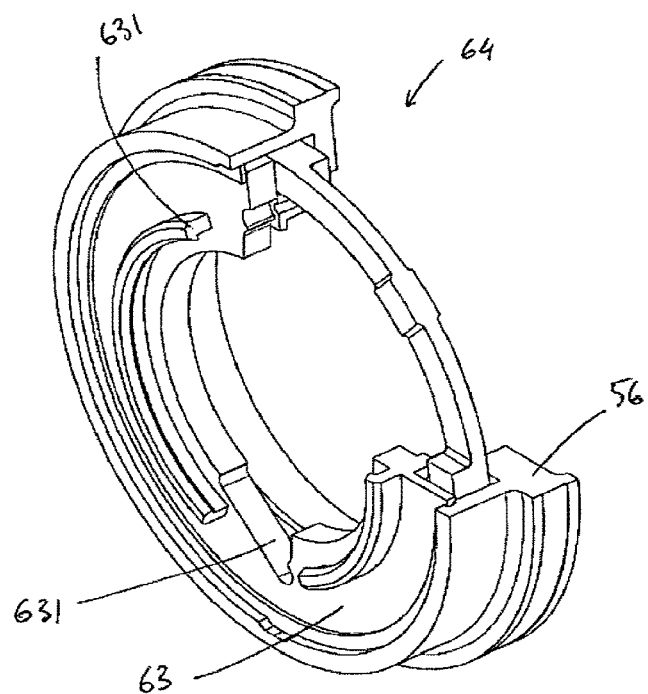
Fig.10
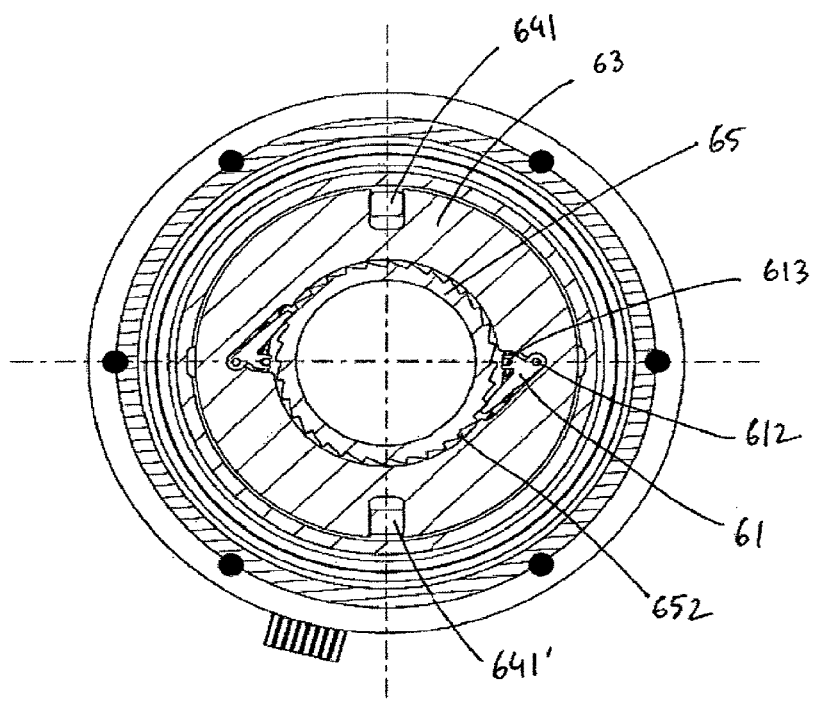
Fig.11 (D-D)

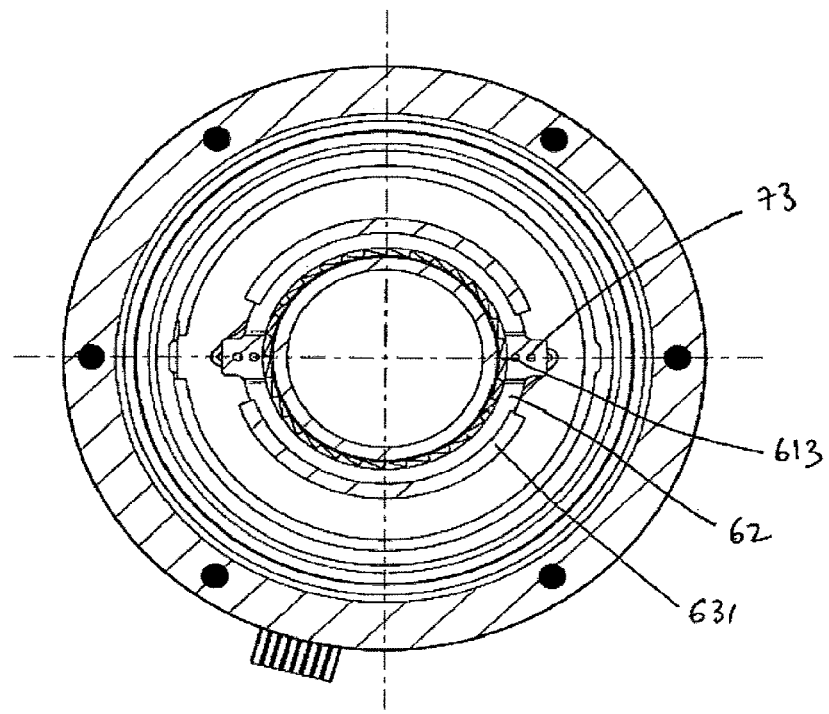
Fig.12 (E-E)
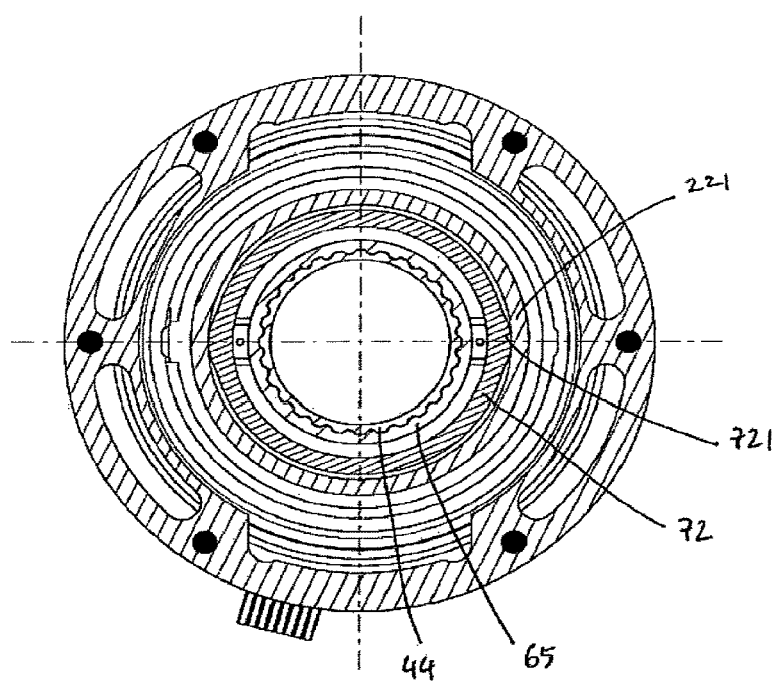
Fig.13 (F-F)

ELECTRIC ASSIST DEVICE FOR A BICYCLE

The invention relates to bicycles equipped with an electric assistance motor. More particularly, the invention relates to the means for transmitting torque between the assistance motor and the transmission chain of the bicycle.

Before more particularly tackling the problems addressed by the present invention, it is appropriate here to recall a number of general features of electrically assisted bicycles. The particular feature of this type of bike is that there needs to be two power transmission pathways: a crankset-wheel pathway which transmits the torque generated by the cyclist, and a motor-wheel pathway. These two transmission pathways need to be able to superpose on one another because in theory and in order to meet regulations, the motor is to supply torque to the wheel only insofar as the cyclist is themself, via the crankset, also supplying torque to the wheel.

There are various configurations of electrically assisted bicycle now available, and the present invention relates to bikes in which the assistance motor is positioned centrally in the bicycle, notably being integrated into the crankset.

There are various distinct phases of operation to be envisioned in the use of an electrically assisted bike: pedaling without assistance (phase 1), pedaling with assistance (phase 2), pedaling at a rotational speed higher than the maximum rotational speed generated by the motor (phase 3), sudden cessation of pedaling by the cyclist (phase 4) and back-pedaling (page 5).

During pedaling without assistance, the way in which the bike behaves, so far as the cyclist is concerned, needs to resemble as closely as possible that of a bicycle without a motor, which means to say that everything necessary for assistance, such as the electric motor, the mechanical reduction gearbox or any other transmission member must neither add additional friction nor generate additional noise nor add additional inertia.

To achieve that, it is common practice to insert a freewheel device in series in the transmission pathway between the motor and the wheel. Traditional bicycles, namely those without electrical assistance, are incidentally practically all already equipped with freewheel mechanisms between the crankset and the wheel. Therefore it is necessary to provide two free wheel devices, each one positioned in one of the two distinct transmission pathways: motor-wheel and crankset-wheel.

It should also be noted that there are two broad freewheel technologies: ratchet-type free wheels, which are lightweight but have a tendency to be noisy, and friction-free wheels that transmit torque by friction with the advantage of being quiet, of having a very small angle of engagement, but which have the disadvantages of being heavy and bulky, of requiring a high level of precision in their execution, making them fairly expensive, and having a residual frictional torque that is often high in freewheeling mode because of the engagement preload applied to the friction cams or needles.

When pedaling with assistance (phase 2), the motor-wheel transmission pathway needs to be operational. The crankset-wheel transmission pathway also needs to be operational.

In the case of a bicycle with a centrally mounted motor, it is common practice to design the bicycle in such a way that the motor-wheel transmission pathway and the crankset-wheel transmission pathway share a maximum of components in common. In general, the motor and the pedals drive a common chainwheel which is connected to the wheel by the conventional link-type bicycle chain. In that case, the motor needs to be able to be connected mechanically in order to supply an assistance motor torque to the crankset or to the chainwheel.

When, in this phase of pedaling with assistance, the cyclist wishes to pedal faster than the maximum speed of the motor, the motor needs to disconnect so that the cyclist is not braked by the motor (phase 3). This is why a simple freewheel is placed at the output of the motor. In general, these free wheels are of two types: ratchet-type or roller type.

Each of these types of freewheel have disadvantages. A ratchet-type free wheel can become noisy whereas a roller-type freewheel will admittedly be quiet but will be heavy and will generate a higher friction torque in a freewheeling phase.

When the cyclist wishes to stop pedaling suddenly (phase 4), it is necessary for comfort and safety reasons for: the response time for the cutting off of the motor to be very short and for the inertia of the motor and of its transmission chain to be low in order to avoid it continuing to drive the cyclist's legs or continuing to cause the bicycle to advance when it is the cyclist's wish to stop instantly. Unfortunately this is not always what happens in bicycles of the prior art.

For example, in the prior art U.S. Pat. Nos. 9,616,969 and 8,757,311 there is, like in most electrically assisted bicycles, a driving chainwheel which is driven in parallel via a first freewheel by the crankset to transmit the pedaling torque of the cyclist and via a second freewheel by the assistance motor to transmit the assistance torque from the electric motor. With such an arrangement, if the cyclist suddenly stops pedaling, the cyclist's legs will no longer be driven in rotation because the first free wheel of the crankset will disengage and the cyclist will be able to stop pedaling immediately. By contrast, the motor will continue to drive the bicycle over its launch for the amount of time it takes to decelerate, and this may prove hazardous if the cyclist needs to stop as a matter of urgency. Furthermore, these solutions have the disadvantage of being relatively heavy and bulky because fitting a parallel drive between the motor and the chainwheel and fitting the second freewheel associated therewith entails the presence of additional mechanical components. Another result of this is that this kind of electrically assisted bicycle suffers from a somewhat unflattering overall look. For example, the bottom bracket shell is oversized. Even if this last feature can be considered to be not too troublesome for an off road bike or a city bike, for which aesthetics sit comfortably with elements of sizable volume (cf. the large diameter of the tubes of the frame) it does represent a serious handicap for road racing bikes in which lightness of weight, aerodynamics and finesse are important and need to be able to be evaluated both from a technical and from an aesthetic standpoint.

In other configurations, for example in EP 2 502 819 the chainwheel is not driven in parallel by two distinct freewheels because the chainwheel is directly connected to the cranks so that when the cyclist decides to stop pedaling suddenly he/she also needs to stop the entire motor transmission chain. Further, because stopping this motor transmission chain requires a certain amount of time, the pedals will continue to turn for this short space of time and drive the legs of the cyclist. This results in an unpleasant sensation which detracts from the comfort and quality of the cyclist's experience. In addition, when the cyclist suddenly stops pedaling, a very high braking torque may be imposed on the motor transmission chain which may lead to damage or breakage thereof. This construction ultimately takes on the form of a simple retro-fitting of an assistance function to an existing bicycle. Although the overall aesthetic of the bicycle might not be greatly affected in these configurations, the disadvantages in terms of comfort of use and reliability of the system make them neither desirable nor recommended.

There is finally a last functional phase in the use of an electrically assisted bicycle which presents problems in certain configurations (phase 5). The first of these configurations is when the cyclist wishes to pedal backwards in order to reposition the pedals, for example on approaching a bend so that they do not scrape against the road surface or when the cyclist wishes to pull away and position their leading foot in a substantially horizontal position.

There is a second configuration during which reverse operation occurs, and that is when a bicycle is being maneuvered in order to put it away. Specifically, if the bicycle travels backward, the rear wheel transmission freewheel will lock and cause the pedals to turn backward. During this phase, which may be referred to as back-pedaling, electrically assisted bicycles that comprise a simple freewheel, for example of the ratchet type, in the motor-wheel transmission pathway, will find that this wheel likewise locks up in reverse operation and therefore drives the motor backward. The turning of the motor in the reverse direction generates a high friction torque and a very high equivalent inertia. In such a case, the cyclist is capable of supplying a high back-pedaling torque, which will bring about a high negative angular acceleration and therefore a very high negative torque because of the high equivalent inertia of the motor, with the risk of destroying the gears in the motor gearbox. Furthermore, with this type of motorized drive, the reduction ratio between the rotational speed of the motor and the rotational speed of the bottom bracket shaft is of the order of 100, and this inevitably reduces the output of this type of reduction gearbox; the reduction gearbox may even become irreversible and lock up as soon as the slightest lack of lubrication or the slightest amount of wear occurs, and this is why patent WO 2016/128789 incorporates a torque limiter that enables the motor to be disconnected in the event of excessively high torque in order to avoid tooth breakages.

This back-pedaling phase is also often performed in the store when purchasing the bicycle. Indeed it is common practice, for a well-informed cyclist, to turn the cranks backward in order to estimate the friction losses in the transmission chain (including the friction of the seals and bearings in the bottom bracket shell, the chain and its rollers and the rolling bearings of the rear free wheel), as this enables an estimation of the quality of the friction in the transmission. When this test is performed on an Ebike (electrically assisted bicycle) with a simple free wheel, the free wheel locks up when running backward and starts to drive the motor backward, because the reduction ratio between the motor and the crankset is high and the motor is therefore driven backward at a high rotational speed, thus increasing the feeling of inertia and generating a high friction torque due to the mechanical and electromagnetic friction of the motor which are multiplied by the high reduction ratio and the inverse of the efficiency of the reduction gearbox, making this backward-running assessment highly negative.

Furthermore, the freewheels used in the electrically assisted bicycles of the prior art are simple freewheels that lock up when a positive motor torque is applied to the input element (the assistance motor) and which is then transmitted to the output element (the bottom bracket shaft). By contrast, the freewheel does not allow a negative torque to be transmitted in the opposite direction to the same input element and will then start to turn freely in this freewheel direction. Thus, everything works as desired when the direction of rotation is the normal direction of use, but when the direction of rotation on the output element, the bottom bracket shaft, is reversed, everything reverses, which means to say that the freewheel will lock up and transmit torque in reverse thus driving the entire transmission chain in reverse, with the above listed disadvantages.

Furthermore, electric assistance devices providing assistance to the crankset sometimes comprise a motor of which the spindle is positioned forward of the bottom bracket spindle and a reduction gearbox enabling the speed of the motor to be reduced but increasing the torque thereof. The motor is usually offset from the bottom bracket spindle because the space around the bottom bracket spindle is very limited in the widthwise direction in order not to increase the width between the cranks and also radially (in the diametral direction) in order not to push the rear wheel further back, so as to ensure that its tire has enough space that it does not rub against the external casing of the motor. Moving the rear wheel back away from the bottom bracket spindle makes the bicycle longer and therefore less maneuverable and more difficult to transport and to store, and also has the effect of making it heavier. These bicycles with an offset motor generally have a reduction gearbox having one or more gear sets in series, or using a chain or a belt. By contrast, certain electrically assisted bicycles have a motor coaxial with the bottom bracket spindle and the rotor of which has a tubular shape rotating coaxially about the bottom bracket spindle and a speed reduction gearbox enabling the assistance torque to be increased.

Regarding the present invention more particularly, it should be recalled that the bottom bracket spindle of a bicycle is a very important component of the bicycle because it: provides the pedaling movement of the cyclist, by providing the pivot connection of the two, right and left, cranks, bearing all of the load coming from the cyclist; supports the chain-drive transmission chainwheel or chainwheels which are conventionally positioned on the right; and ensures cohesion between the right and left crank by notably transmitting the driving torque supplied by the left pedal to be transferred to the transmission chainwheel.

Ever since the invention of the bicycle, the spindle and its cranks and the chainwheels have undergone numerous improvements with a view to lightening and/or stiffening and/or increasing the robustness of this entire assembly.

Notably, in the crankset of a present-day racing bicycle, the chainwheel or chainwheels are set directly into the right crank arm by means of four or five screws to optimize the stiffness and total mass of the assembly, in the knowledge that the chainwheel transmits all of the driving load to the chain, the application of the invention requires that the assistance torque be provided either directly to the right crank or to the left crank, by passing via the spindle or directly to the spindle.

Included among the most recent changes, notable mention may be made of Patent EP 1449760 which describes a set of cranks comprising a right crank rigidly connected to the tubular bottom bracket spindle and to the transmission chainwheels and a removable left crank fixed to the left end of the tubular spindle via splines and binding screws. This construction involving a large hollow spindle set directly into the right crank is more lightweight than a dismantlable connection and the left crank is set onto the spindle via splines which also allow for axial translation so that the play in the rolling bearings of the bottom bracket shell can be adjusted before the assembly is immobilized using the two binding screws.

This technical solution offers the advantage of being extremely lightweight while at the same time having very high stiffness and very good robustness, and in addition it is simple and quick to assemble so that time savings can be achieved during assembly and/or maintenance.

Unfortunately, this solution cannot be applied to electrically assisted bicycles for which the assistance power is transmitted directly to the bottom bracket shaft. This is because the cranksets of electrically assisted bicycles are generally made up of a central bottom bracket spindle connecting the two, right and left, cranks, with a peripheral tube positioned on this central spindle, which tube allows the transmission torque to be transmitted to the driving chainwheel, this torque being the sum of the torque from the cyclist plus the assistance torque (cf. reference 30 in FIG. 3 of EP 2 724 926).

In addition, these cranksets are often made up of solid spindles and independent cranks fixed to the ends of these solid spindles by removable fixing means. Such assemblies which are substantially equivalent to the technical solutions employed in traditional bicycles over 30 years ago are far heavier than the optimized solutions of bicycles today.

At the present time, in all the known assistance systems it is never possible simply to remove the bottom bracket spindle axially without completely dismantling the bottom bracket shell. This is because the removal of the spindle systematically entails opening the bottom bracket shell and sometimes dismantling the entire assistance device.

It is an objective of the present invention, on the one hand, to apply all the technical improvements that have been made to the cranksets of bicycles to the construction of an electrically assisted bicycle in order to optimize its lightness of weight, its rigidity and its robustness. An objective of the invention is, on the other hand, to facilitate the assembly and maintenance of the crankset on an electrically assisted bicycle. Finally, an objective of the invention is also to standardize the fitting of a traditional crankset to an electrically assisted bicycle in order to reduce the number of component references that need to be managed across the entire bicycle industry from the repairer in their store, through to the bicycle builder and as far as the crankset manufacturer.

Another objective of the invention is to provide an electric assistance device for a bicycle which while operating optimally in the variable functional phases described hereinabove, adds little or no additional weight to the bicycle, does not impede the comfort of the cyclist and has the least possible adverse effect on the aesthetics of the bicycle. A further objective of the invention is to propose an assistance device which offers quiet operation and extremely low friction. Another objective of the invention is to propose an assistance device which is the least bulky and the least heavy possible.

The objective of the invention is achieved by the supply of an assistance device for a bike comprising a motor, a reduction gear, a freewheel and a shaft rotating solidly with a right crank and a left crank; said motor being coaxial with the shaft and transmitting an assistance torque to the shaft via the freewheel; said device being intended to be housed inside a bottom bracket shell; said shaft being mounted with the ability to rotate relative to said shell by virtue of two ball bearings; said freewheel being made up of several components which are placed between the motor and the shaft; the device further comprising a torque transmission ring enabling one of the components of the free wheel to be secured to the shaft or to one of the cranks; said transmission ring being at least partially placed under one of the two ball bearings.

The objective of the invention is also achieved by the supply of an electric assistance device having one or more of the following features, in any technically acceptable combination:
- the torque transmission ring comprises a first mechanical connection with one of the components of the free wheel and a second mechanical connection with the shaft or with one of the cranks; and at least one of the two mechanical connections can be disconnected in such a way as to remove the shaft.
- the transmission ring is positioned in the vicinity of the right crank and the disconnectable mechanical connection is the one between the ring and one of the components of the free wheel.
- the free wheel comprises at least one ratchet pawl capable of coming into abutment on the teeth of a ratchet wheel and the ratchet wheel can be secured to the transmission ring by splines.
- the transmission ring comprises a splined portion and a portion of frustoconical shape.
- the transmission ring is fixed to the shaft by bonding, shrink-fitting or radial bind screws.
- the transmission ring comprises a cylindrical portion intended to surround the shaft and a radial arm extending from the cylindrical portion, said radial arm comprising means of blocking with the right crank.
- the transmission ring is placed in the vicinity of the left crank and the disconnectable mechanical connection is the one between the ring and the shaft or the left crank.
- the transmission ring comprises a first portion comprising a tooth set of which each of the teeth is able to come into contact with a ratchet pawl of the free wheel and a second portion comprising means for blocking the rotation with the left crank or with the shaft.
- the rotation blocking means comprise a key.
- the rotation blocking means comprise internal splines able to collaborate with external splines formed on the shaft.
- the shaft and the right crank constitute an independent subassembly that can be disassembled from the device without the need to remove the ball bearings of the device.
- the shaft has a diameter D4 that is substantially constant over its entire length and this diameter is less than or equal to the inside diameter D224 of the ball bearing placed in the vicinity of the right crank.

Advantageously, the device according to the invention is able to solve two major technical problems with assistance devices with a centrally positioned motor; the transmission of the assistance torque to the spindle and the retention of the parts of the device on removal of the spindle. Specifically, if the assistance torque is to be transmitted by the spindle to the chainwheel, and not by an additional component connected independently to the chainwheel, it is necessary to provide transmission means on the spindle, which means may constitute radial protuberances which come into conflict with the ball bearing rings because the bottom bracket shell is closed at its two ends by two ball bearings of identical diameter. In addition, because the mechanism of a central motor housing is relatively complex and comprises numerous coaxial components (freewheel, rolling bearings, spacers, gears, motor, sensor, etc.) and because all of that is designed to be housed in a limited radial space, the spindle itself is generally a central element essential to the position of the various components. This is why there is a risk that when the spindle is removed, certain of the components adjacent thereto might drop into the housing, thereby making it difficult for the spindle to be refitted or making replacing the spindle with another spindle impossible or difficult.

In a first embodiment, a torque transmission ring is set onto the bottom bracket shaft, this ring being able to bear against the shoulder of the right crank. This ring has external splines of a shape that complement that of the internal splines formed inside the freewheel ratchet wheel. This insetting may be achieved by shrink fitting.

In variants of the first embodiment, the insetting may also be achieved by bonding, pinning, a pivoting fit on the spindle prevented from rotating by a dog on the crank (tangential projection bearing against the crank to transmit the torque) or as a pivoting fit on the spindle with a torque reacting arm fixed by screws or pinning.

In all cases, the inside diameter of the bearing on the right hand side (which is to say on the same side as the chainwheels) needs to be greater than (or equal to) the diameter at the top of the splines.

For example, for a crankset with a shaft diameter of 24 mm, the diameter at the top of the splines is 29 mm, the inside diameter of the rolling bearing on the right hand side is 30 mm, the diameter of the rolling bearing on the left hand side needs to be at least 24 mm. Nevertheless, it needs to be 25 mm or 30 mm, if a ring is to be inserted.

In a second embodiment of the invention, the transmission of torque is performed via a transmission ring which will transmit the torque from the left side (the opposite side to the chainwheels), said ring having a key which connects with the clamping slot of the left crank.

In variants of the second embodiment of the invention, the transmission ring has internal splines of a shape that complement the shape of the external splines already present at the end of the shaft for connecting the latter to the left crank.

The invention will be better understood in the light of the description which follows. The drawing appended thereto comprises:

FIG. 3 is a view in longitudinal section of the casing on the plane A-A.

FIG. 4 is a view in longitudinal section of the casing on the plane B-B.

FIG. 6 is a view in cross section on the plane C-C.

FIG. 7 is a perspective view of one of the disks.

FIG. 10 is a partially sectioned perspective view of the Oldham coupling.

FIG. 11 is a view in cross section on the plane D-D.

FIG. 12 is a view in cross section on the plane E-E.

FIG. 13 is a view in cross section on the plane F-F.

Figure 1:
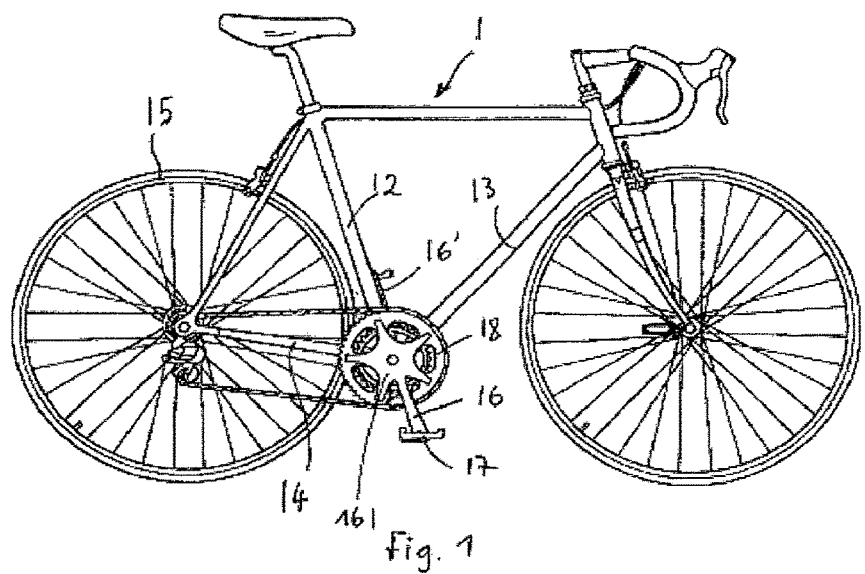
FIG. 1 is an overall view of a bicycle incorporating an electrical assistance system according to one example of the invention.

FIG. 1 illustrates an electrically assisted bicycle 1 incorporating an assistance system according to the present invention. In the known way, this bicycle comprises a frame to which two wheels are fixed. The rear wheel 15 provides the motive power and is driven by the crankset consisting of a pair of cranks 16, 16' and of two pedals 17. The right crank comprises a spider 161 of which the ends are used to attach at least one toothed chainring 181, 182. The transmission chain 19 mechanically connects one of the toothed chainrings 181, 182 to the rear wheel 15.

Figure 2:
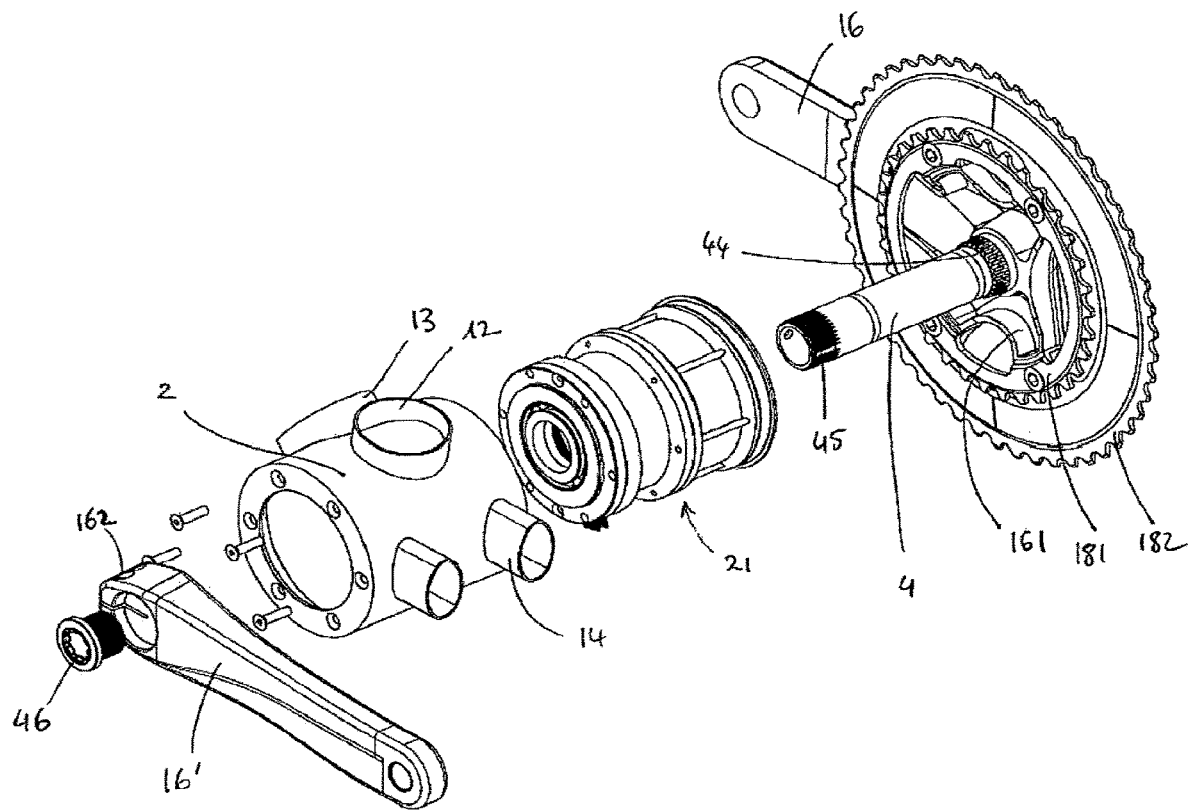
FIG. 2 is an exploded view of the bottom bracket shell and of the assistance device according to a first embodiment of the invention.

FIG. 2 shows an exploded view of the assistance device according to a first embodiment of the invention. The bottom bracket shell 2 which forms an integral part of the frame and connects a certain number of the tubes of which the frame is formed. It is possible to see the lower part of the down tube 13, the lower part of the seat tube 12 and the anterior ends of the rear dropouts 14. The casing 21 containing a certain number of the components of the assistance device is intended to be housed inside the bottom bracket shell 2.

The crankset itself comprises the left crank 16', a subassembly consisting of the shaft 4, the right crank 16 and the spider 161. The right crank 16 comprises an extension known as the spider 161 which is used for the attachment of the chainrings 180, 182. The right crank 16 is preferably permanently fixed to the shaft 4. The shaft (4) has an outside diameter D4, which is constant over appreciably its entire length. A torque transmission ring 44, also referred to as splined ring 44, is affixed on the shaft near the spider 161.

This ring 44 performs two mechanical connections. The first of these mechanical connections is the connection that connects it to the shaft 4 and the second is the connection that connects it to the freewheel 6. In the first embodiment of the invention, the first mechanical connection is permanent or semipermanent, whereas the second mechanical connection can be easily disconnected, for example when the user wishes to change crankset without having to dismantle the device entirely in order to do so.

One first way of integrating this ring 44 with the shaft is to bond it to the shaft 4 of a standard crankset using a high sheer-strength adhesive, such as a two-part epoxy or an anaerobically cured adhesive, having taken care to prepare the surfaces beforehand according to the rules of the art (decreasing, possible sandblasting, etc.). This solution has the advantage that it can be performed on a standard commercially-available crankset using limited means.

This splined ring may also form an integral part of the shaft 4 or of the right crank by being machined directly into same, in which case the shaft 4 needs to be designed and produced specifically right from the outset in order to be compatible with the invention.

A third solution is to mount the ring 44 on the shaft 4 by shrink-fitting, taking care to ensure that there is always enough clamping force between the shaft 4 and the splined ring to transmit the assistance torque with a margin of safety. This shrink-fitted mounting may be combined with longitudinal striations made in the bore of the splined ring in order to increase the amount of torque that can be transmitted, this solution entailing several hundredths of an mm of clamping being conceivable for a standard crankset if the tolerances on the shaft 4 are sufficiently small. This shrink-fitted mounting may be facilitated by cooling the shaft 4 and heating the splined ring before assembling them.

In a fourth solution, this splined ring 44 may simply be pivot mounted on the shaft 4 with a very small amount of clearance with its external end situated against the right crank having arranged on it a disk, or at least one radial arm, preferably which is very flat in order to minimize axial bulk, and with the end of the arm radially distant from the central axis of the crankset comprising an axially projecting zone collaborating with a face or an opening made in the right crank or the crankset spider so as to be able to provide a rotational connection between these, capable of transmitting the assistance torque. This variant will be described later on in the description.

In order to make this last solution adaptable to suit numerous standard cranksets available on the market and without complicated intervention, the axially projecting zone described hereinabove may be created by means of an interchangeable component attached to the arm of the splined ring 44, it being possible for this component to be produced for example in thermoplastic using 3D printing in order to be perfectly matched to the design of the right crank. Similarly, the disk situated at the end of this splined ring 44 may comprise one or more holes collaborating with small pins that are attached in one or more holes made in the internal face of the right crank.

Splines 45 are formed at the distal end of the shaft 4. These splines serve to transmit torque from the left crank 16' to the shaft 4. The left crank 16' is clamped against the shaft by screws 162 arranged perpendicular to the axis of rotation of the crankset X. In the known way, a screw 46 is able to clamp the two cranks together axially through the shaft 4 in order to apply a slight axial preload to the ball bearings.

In addition, this type of crankset having a right crank of one piece with the spindle has the huge advantage of having an extremely short maintenance and assembly time, enabling assembly and repair costs to be reduced.

FIG. 3 shows a longitudinal section in the plane A-A of the casing 21 and of the various components housed therein.

The casing 21, intended to be housed inside the shell 2, contains most of the elements of the assistance device. It is immobilized inside the shell by screws or any other equivalent fixing means. It is made up of two juxtaposed compartments, each one closed by a cover. The left compartment 211 houses the motor 3 and the measurement means 9. It is closed, on one side, by the left cover 23 and on the other by the central wall 213. The right compartment 212 is fixed against the left compartment 211 at the level of the central wall 213. It houses the reduction gearbox 5 and the free wheel 6. It is closed by the right cover 22. The fixing of the right compartment 212 and of the cover 22 is performed using long screws 222 (visible in cross section in FIG. 5) which fix the cover 22 to the central wall 213, sandwiching the right compartment between them.

Measurement means 9 are housed inside the casing, these means notably enabling command and control of the motor. A first measurement means placed on the cover 22 which will not be described in detail enables measurement of the horizontal component of the load borne by the ball bearing 224 situated on the crankset side. This measurement of horizontal component is affected chiefly by the load in the chain and thus makes it possible to determine the load in the chain and from that work out the total torque transmitted at the crankset; another patent application in the name of the Applicant describes how the torque provided by the cyclist can thus be deduced from a measurement of total torque so that the assistance torque is substantially proportional to the torque transmitted by the cyclist.

A second measurement means is made up of a first angular sensor 91 associated with a first encoder disk 92 connected to the rotation of the bottom bracket shaft; it notably enables detection of the rotation of the crankset and the direction of rotation thereof so that no assistance torque is provided in the event of a back-pedaling action, as provided for by the standards in force. This sensor will essentially be of use when the assistance is inactive so as to determine the speed and acceleration of the pedaling by the cyclist; it will be particularly useful for detecting the start of the assistance so that this can start quickly, and also detecting the cessation of pedaling, even though the latter could also be managed more finely by a second sensor.

A third measurement means is also made up of a second angular sensor 93, associated with a second encoder 94, connected with the rotation of the motor via a measurement ring 37.

A fourth measurement means, which this time is external to the housing, being situated for example near the rear wheel, senses the speed of forward travel of the bicycle so as to be able to manage the cutting-off of the assistance torque when the speed of the cycle approaches the programmed speed limit so as to conform with the legislation in force.

The motor 3 is a three-phase electric motor of the multipole brushless type with a central rotor comprising permanent magnets; it is covered by an electronic power controller itself powered by a battery (not depicted) attached to the frame, or housed inside same. The rotor 32 rotates as one with a measurement ring 37 past a sensor 93 that is fixed with respect to the casing 21, enabling the precise measurement of the angular position of the rotor relative to the stator, this information being needed in order to allow the controller to perfectly manage the electrical control of the three phases according to the position of the rotor, but also to manage the setpoint for the assistance torque that is to be generated. This sensor may be an induction-type or Hall-effect type magnetic sensor or an optical sensor but it is desirable for it to have an angular resolution better than $360/(6 \cdot n)$ where n represents the number of pairs of poles of the motor, by way of example for a motor having ten pairs of poles, the angular resolution of this sensor needs to be far better than 6° in order to switch the phases properly at the correct point for trapezium-wave switching; if there is a wish to control the motor using a sinusoidal voltage then this resolution will need to be further improved by at least a factor of 5 in order to phase the sinusoidal signal correctly with respect to the angle of the rotor. Access to this highly precise angular information regarding the rotor also makes it possible to determine, with a very high degree of precision, the speed and angular acceleration of this rotor which, when the assistance system is active, are proportional to the angular speed and angular acceleration of the crankset, and so monitoring this signal makes it possible to optimize feedback-control with respect to the pedaling and notably to rapidly detect phases of abrupt cessation in order to act, for example, on an emergency stop procedure.

The motor 3 is of annular overall shape with a central opening of a diameter greater than D4 so as to allow the shaft 4 to pass through it. The motor 3 is made up of a stator 34 comprising the multiple windings for the three phases of the motor, inside which the rotor 32 and the magnets 33 fixed thereto, turn. The rotor 32 also rotates as one with the driving member 31 the purpose of which is to drive the shaft 4 via the reduction gearbox 5 and the freewheel 6. The driving member 31 comprises a first portion 311 mounted tightly in the rotor and a second portion 312 which constitutes the central part of the reduction gear 5. Two ball bearings 313 and 314 center the driving member 31 in the casing 21. Two eccentrics 315 and 316 are fitted onto the second portion 312 of the driving member 31 and clamped axially by a nut 318 so that the rotor 32, the driving member 31 and the eccentrics 315 and 316 are perfectly solid with one another in terms of rotation.

Figure 8:
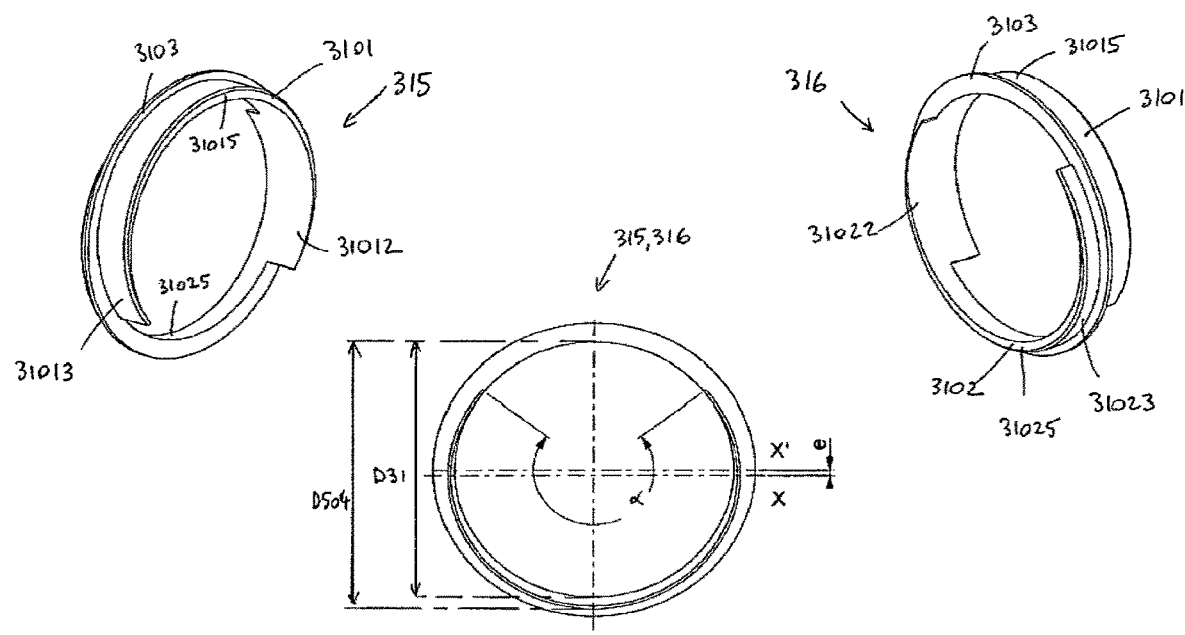
FIG. 8 is a perspective view of the two eccentrics.

The eccentrics 315 and 316 are identical and depicted in perspective in FIG. 8. They comprise a washer 3103 which on each of its flanks has a projecting cam. On the first flank, the first cam, also referred to as lateral cam 3101 projects over an angular extent a. It comprises a cylindrical internal surface 31012 of diameter D31 and a cylindrical external surface 31013 of diameter D504, but the axis of which is eccentric by an amount "e" with respect to the axis of the internal surface 31012. It may also be noted geometrically that the external diameter D504 needs to be greater than or equal to the sum of the internal diameter D31 and twice the eccentricity "e" (D504≥D31+2e) so that these two diameters do not intersect. In order to minimize the radial bulk of the reduction gear, it is preferable for the diameter D504 to be just equal (within the functional clearance) to the sum of D31 and twice "e" (D504=D31+2e), in which case the inside diameter D31 and outside diameter D504 become just tangential, thus minimizing the radial bulk, the tangency of these two diameters is thus clearly visible in section C-C of FIG. 6.

In practice, and to limit the radial bulk of the assistance device, it is sensible to choose a diameter D504 of 30 mm.

The washer 3103 on its second flank comprises the second cam, also known as the central cam 3102, projecting over an angular extent a. It comprises a cylindrical internal surface 31022 of diameter D31 and a cylindrical external surface 31023 of diameter D50, and eccentric by an amount "e" with respect to the axis of the internal surface 31022. The apex 31015 of the lateral cam 3101 and the apex 31025 of the central cam 3102 are diametrically opposed, which is equivalent to stating that the two cams 3101 and 3102 are phase-shifted with respect to the axis of their board D31 by 180°, namely half a revolution.

It may be noted that the thickness, in the radial direction, of the cams 3101 and 3102 is variable and that it has a minimum value at its two angular ends; for technical production reasons it is very tricky to end with a tab that is too slender and too weak to be created or even handled and this is why it is preferable to limit the angle α so that the minimum thickness of the cams is greater than a few tenths of a millimeter. The angle α (alpha) is greater than 180° and may reach a value of 360°. In the latter instance, the lateral and central cams project from the entire circumference of the flanks of the washer. The smaller the angle α, the lighter the weight of the eccentrics, although their centering will not be as good. In the embodiment described here and which constitutes a preferred embodiment, the angle α (alpha) equals approximately 260°.

The eccentrics 315 and 316 are mounted opposite one another so that the central cam of the eccentric 315 is placed against the central cam of the eccentric 316, their respective apexes having the same angular position.

Although the eccentrics 315 and 316 are fixed to and rotate solidly with the driving member 31, their purpose is to drive planet pinions as will be explained later on. These two eccentrics 315 and 316 are, on the one hand, centered by their bore D31 which is fitted onto the shaft of the second portion 312 of the driving shaft 31 but also via their outside diameter D504, fitted into the bore of the common ball bearing 521, this dual centering thus forces them to remain correctly angularly in phase with one another.

These eccentrics may be machined from aluminum alloy bar stock for short production runs or may be pressure die cast in a zinc alloy of Zamak type for longer production runs, enabling very fine and very precise components to be obtained at low cost.

The reduction gear 5 is of the cycloidal type, namely comprises three distinct components capable of rotating relative to and coaxially with respect to one another, one of the three being kept fixed. That one of the components that is connected to the motor is known as the "input" of the reduction gearbox whereas the other of the components that is in rotation coaxially with the input is known as the "output" of the reduction gearbox. In the first embodiment of the invention, the input of the reduction gearbox 5 consists of the driving member 31 which, as was explained hereinabove, is solid with the rotor 32. The output of the reduction gearbox 5 itself consists of an annulus gear 55 and a drive ring 56 securely attached thereto. Between the output and the input of the reduction gearbox 5 there is the plant carrier 57.

Figure 5A:
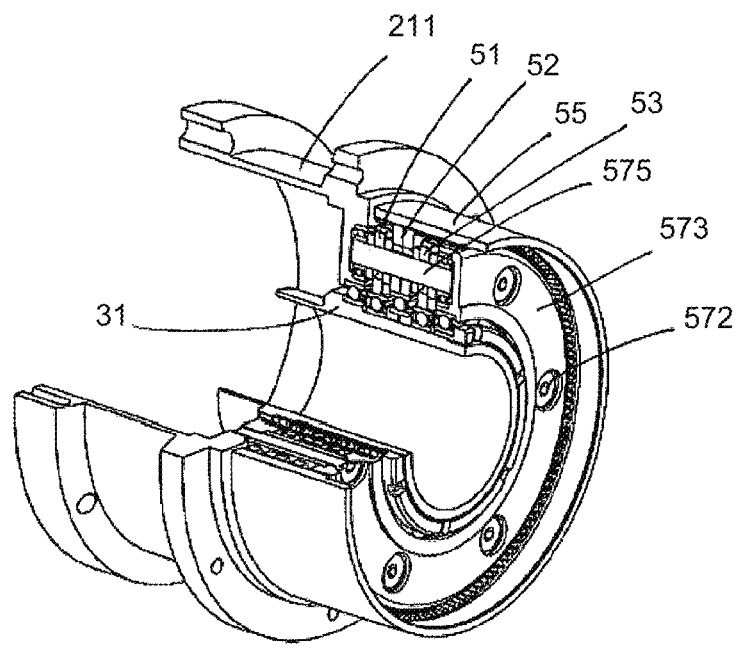
FIG. 5a is a partially sectioned perspective view of the reduction gearbox.
Figure 5B:
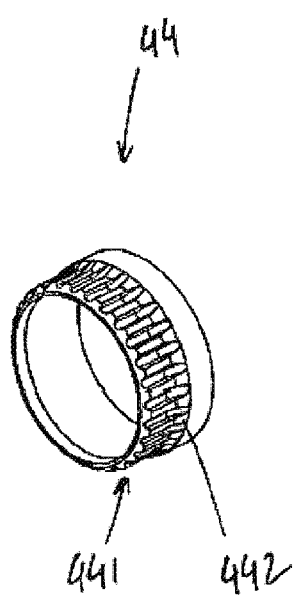
FIG. 5b is a perspective view of the transmission ring.

The plant carrier 57 is, in this first embodiment, fixed in terms of rotation and chiefly comprises a right flange 573 fixed to the central wall by six screws 572 and six spacers 571. In this embodiment, the central wall 213 constitutes the left flange 574 of the planet carrier. A space, or cage, is thus delimited between the right flange 573 and the left flange 574 (namely the central wall 213). It is inside this space that the three planet pinions 51, 52 and 53 lie. FIG. 5, which is a cross section on the plane of section C-C shows that the six screws 572 and the six spacers 571 are uniformly distributed over the circumference.

The first and third planet pinions 51, 53, referred to as the lateral planet pinions, are identical and each consist of a single toothed disk 50 visible in perspective in FIG. 7. The second planet pinion 52, referred to as the central planet pinion, consists of two identical and juxtaposed toothed disks 50.

Each toothed disk 50 comprises a central bore 504 of diameter D504 and an external tooth set 503 with a pitch circle diameter D50. It also comprises a first series of six wide openings 501, uniformly distributed on the circumference. When the disks 50 are in place in the planet carrier, the wide openings 501 have the screws 572 and the spacers 571 passing through them.

The toothed disks also comprise a second series of six circular openings 502, of diameter D502, uniformly distributed at the periphery. The role of these circular openings 502 is visible in the view of FIG. 4 which is a longitudinal section on the plane B-B and in FIG. 6.

Each of these circular openings 502 has passing through it one of the six small shafts 574 which are mounted between the right flange 573 and the left flange 574 via small ball bearings 576 and 577. These small shafts 575 have an outside diameter D575 substantially equal to D502 minus twice the eccentricity "e" (D575+2e=D502). Although the small shafts 575 have a diameter smaller than that of the circular openings 502, they remain in contact with one another at every moment. Because these small shafts 575 are highly stressed in rotary bending, they need to be sufficiently strong. Nevertheless, and to limit the overall bulk of the device and also the weight, they are chosen to have a diameter of approximately 4 mm.

The planet pinions are mounted on the eccentrics 315 and 316 as follows: the lateral planet pinion 51 is mounted on the lateral cam 3101 of the eccentric 315 by virtue of a ball bearing 511. Similarly, the lateral planet pinion 53 is mounted on the lateral cam 3101 of the eccentric 316 by virtue of a ball bearing 531. The central planet pinion 52 which, it will be recalled, is twice as thick as the lateral planet pinions because it comprises two juxtaposed disks 50, whereas the lateral planet pinions comprise only one, is mounted on the juxtaposed central cams of the eccentric 315 and of the eccentric 316 by virtue of a ball bearing 521. It will be noted that the washers 3103 of the eccentrics 315, 316 act as spacer pieces between the internal rings of the rolling bearings 511, 521 and 531.

The mounting of the planet pinions 51, 52 and 53 forces them to mesh with the internal tooth set 551 of the annulus 55, the pitch circle diameter of which is D55. In addition, because they have the small shafts 575 passing through them, which do not rotate about the axis X and which are, furthermore, in contact therewith, their only possible movement is a circular translation movement of axis X the path of which is a circle of radius equal to "e". The movement of the planet pinions therefore generates a rotation about the axis X of the annulus 55.

Unlike a conventional epicyclic gearset, the three planet pinions 51, 52 and 53 are not equally distributed over the circumference, namely separated from one another by an angular separation of 120° for example. Indeed, the mounting of these planet pinions on the eccentrics 315, 316 which, as was seen hereinabove, have cams the apexes of which are diametrically opposed, means that, at every instant, the angular position of the point of meshing of the central planet pinion 52 with the annulus 55 is diametrically opposed to that of the points of meshing of the lateral planet pinions 51 and 53. The effect of this configuration is to balance all the forces and moments other than the torque of rotation about the axis X to which the three planet pinions subject the annulus 55. Since, on the other hand, the annulus 55 and the drive ring 56 connected to it are connected to the freewheel via an Oldham coupling (see below), it can be stated that the annulus 55 is subjected to a pure turning moment of axis X.

In practice, the rotation of the motor at a positive angular velocity ω1, causes the driving member 31 and the eccentrics 315 and 316 to rotate at the same speed. The eccentrics generate the specific movement of the planet pinions 51, 52 and 53, which drive the annulus 55 in a positive rotation of velocity ω2 which is very much less than ω1.

The reduction ratio R is equal to (D55−D50)/D55. If the reduction ratio R is expressed in terms of the number of teeth Z55 of the annulus 55 and the number of teeth Z50 of the planet pinions 50, this yields the following formulae:

$$R = \frac{D55 - D50}{D55} = \frac{Z55 - Z50}{Z55} \quad \text{[Math 1]}$$

Advantageously, a reduction ratio comprised between 1/30 and 1/60 will be chosen. Above 1/30, the motor used will be capable of providing a significant torque, which implies that its magnetic circuit will also need to be substantial and therefore somewhat heavy. The use of a reduction ratio lower than 1/60 implies the use of a motor which rotates very quickly and in which the eddy current losses are significant, and this considerably impairs the efficiency.

In the embodiment described here, we have R=1/46 (Z55=138, Z50=135). Knowing that the eccentricity "e" is defined as being equal to (D55−D50)/2, it can be deduced that: e=R×D55/2. In the embodiment described, we have e=0.7 mm.

The tooth sets depicted in this first embodiment are straight-cut involute tooth sets having a tooth set module equal to 14/30 (approximately 0.467 mm), the external annulus 55 having 138 teeth therefore has a pitch circle diameter of 64.4 mm, the planet pinions 51, 52 and 53 possess 135 teeth and therefore having a pitch circle diameter of 63 mm, and because these two gearsets have very similar pitch circle diameters, their meshing presents a number of design problems in order to allow their teeth to mesh without interference, and so a standard design of tooth set, accessible to those skilled in the art, with a pressure angle of 20° and an addendum equal to the module and a dedendum equal to 1.25 times the module, namely a tooth height of 2.25 times the module, is completely unsuitable for this type of reduction gear because of the interference between the tooth sets blocking up the gearing at the input and at the output, and this problem has been solved in the present case by using a small module of 14/30 of an mm, a pressure angle equal to (or greater than) 31° and an addendum equal to (or less than) 0.9 times the module with a dedendum equal to one times the module, which of necessity has to be strictly greater than the addendum of the other pinion engaged. It should be noted that it is preferable to limit the pressure angle, within the limits of non-interference, in order to maximize the radial components generated and thus maximize the efficiency of the reduction gearbox. Increasing the pressure angle reduces the theoretical angle of contact of the tooth set, but the finite element study of the tooth set deformation demonstrates that a high number of teeth come into contact in spite of this and transmit the line of the tooth set because the fact that the pinions 51, 52 and 53, which have one hundred and thirty five teeth, and the annulus 55 which has one hundred and thirty eight teeth, have very similar numbers of teeth leads to tooth profiles that are very similar and mesh over a great many teeth with contacts of low curvature and the same sign thus leading to very low contact pressures so that high torques can be transmitted with only little vibration and noise generated.

The problems of teeth set interference are connected with the addendum height of the tooth and with the pressure angle and so it is highly preferably to add teeth while reducing the module, this compromise here being by no means a trivial matter to a person skilled in the art and having to be optimized for each desired reduction ratio, in the knowledge that the problems of interference are less critical for a ratio of 1/30 than for a ratio of 1/45; with a ratio of 1/30 it is possible to reduce the pressure angle and/or increase the addendum of the tooth.

The planet pinions are stressed at the contact points of the tooth set and also in the circular openings 502 in which the small shafts 575 roll without slipping, this contact giving rise to a relative high contact pressure and requiring a sufficient level of hardness for the small shafts 575 but also for the circular openings 502 of the planet pinions 51, 52 and 53 which may be made from a pretreated or hardened steel or a case-hardened or nitrided steel which is very good for this type of contact.

In another variant, the pinions may be made in thermoplastic with the addition of a metallic insert in each circular opening in order to better withstand the pressure of the small shafts.

The geared motor unit set out in this first embodiment is able to transmit a continuous assistance torque of 30 N·m at a rotational speed of 100 rpm, which corresponds to a continuous power of around 315 watts, its bulk is very limited because the external casing has a total length of 90 mm and its outside diameter, inserted into the frame, measures just 79 mm. The length L5 of its reduction gearbox measures 23.5 mm, while the overall length L5+L6 including the reduction gearbox and the wheel mechanism measures merely 36.7 mm. The mass of the geared motor unit is merely 345 g while the mass of the motor weighs 260 g and the total mass of the geared motor housing weighs under 950 g.

Advantageously, in this embodiment, the layout of the two external disks which are eccentric in phase opposition relative to the two twinned central disks ensures perfect dynamic balancing thus generating no vibration or unwanted noise.

Figure 9:
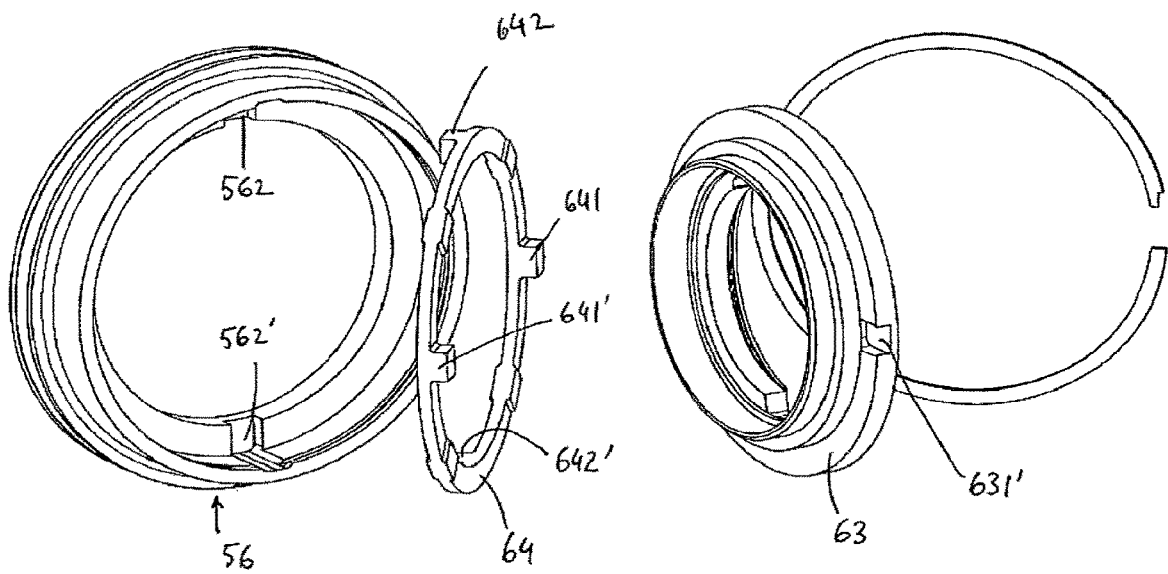
FIG. 9 is an exploded perspective view of the Oldham coupling.

The output of the reduction gear is connected to the shaft 4 via the freewheel 6. To absorb any lack of concentricity between rotation of the drive ring 56 and the body of the freewheel 63, an Oldham coupling 64 is fitted between the two elements (see FIGS. 9 and 10). The Oldham coupling 64 takes the form of a ring comprising, on one of its faces, two diametrically opposed right protuberances 641, 641' and, on its other face, two other, left, protuberances 642, 642', likewise dielectrically opposed. The diameter on which the right protuberances lie and the one on which the left protuberances lie are mutually perpendicular. The right protuberances 641, 641' are received in right housings 631, 631' formed in the freewheel body 63 and in a shape that complements the shape of the protuberances, and the left protuberances 642, 642' are housed in left housings 562, 562' formed in the drive ring 56.

This Oldham coupling can be made from a material that has shock-absorbing properties so as to filter out any deficiencies with the meshing of the tooth sets and any variations in torque that are caused by the motor so as to limit the noise emitted by the geared motor unit.

In this first construction, the rotation of the motor is admittedly coaxial with the central shaft of the crankset overall, but its running setup makes absolutely no reference to this crankset central shaft, and so the centering of the rotor in the stator, which needs to be very precise because of the very small air gap between the rotor and the stator, is thus very well assured and completely independent of the high loads that may act on and deform the central shaft; the Oldham coupling here has the function of connecting the two without adding the burden of the effects of static indeterminacy.

The freewheel 6 will now be described in detail. It in the conventional way comprises two ratchet pawls 61 and a synchronizing ring 62. The ratchet pawls 61 are pivot mounted around small spindles 612 inside a housing 631 formed in the freewheel body 63. The ratchet pawls 61 pivot between an "engaged" position (not depicted), in which their distal end is in mesh with one of the teeth 652 formed on the ratchet wheel 65, and a "disengage" position depicted in FIG. 11 (section D-D).

A synchronizing ring 62 (see FIG. 12) synchronizes the pivoting movement of the two ratchet pawls 61. This ring is connected to the ratchet pawls by two pins 613. It is mounted with the ability to pivot about the axis X by virtue of a rim 631 which guides it and holds it by clipping against the freewheel body 63. The synchronizing ring 62 has a small amplitude of rotation with respect to the freewheel body 63. Specifically, the synchronizing ring is fixed to the ratchet pawls at a distance of a few millimeters from their pivot point so that the pivoting of the ratchet pawls 61 about the small spindles 612 causes the pins 613 to move by a few degrees.

The two ratchet pawls 61 are 180° apart making it possible to balance the loads transmitted by, in theory, transmitting a pure torque with no radial component, and substantially halving the load transmitted by each of the ratchet pawls. The ratchet pawls preferably have an end with a nose engaging with teeth 652 formed on the ratchet wheel 65. Thus, as soon as the end of the ratchet pawl comes into contact with the ratchet wheel 65, the ratchet pawl will then continue its travel to automatically engage to the bottom of the tooth in spite of the friction that opposes engagement thereof, allowing these to remain perfectly stable once engaged, the synchronizing ring 62 pivot mounted on the output of the reduction gearbox synchronizes the rotation thereof so that they do indeed engage simultaneously.

The freewheel also comprises means enabling the control of the ratchet pawls 61, and notably allowing these to be kept in the disengaged position. These means comprise a friction ring 72 and two pins 73. FIG. 13 shows the geometry and operation of the friction ring 72. The friction ring is an elastically deformable annulus which comes to bear with preload against a fixed part of the device over at least two regions. In the embodiment depicted, the fixed part is a cylindrical barrel 221 projecting from the interior face of the cover 22. This ring comprises two diametrically opposed bulges 721 formed on the interior face of the ring. These bulges are intended to slide over the internal surface of the barrel 221 emanating from the cover 22. The friction ring 72 is made to rotate solidly as one with the synchronizing ring 62 by two pins 73 which are inserted into two diametrically opposed radially oblong holes. To ensure a certain degree of clamping of the friction ring on the barrel 221, the outside diameter between the two bulges is, in the unconstrained state, slightly greater, by around 0.5 mm, than the outside diameter of the barrel 221. The fitting of the friction ring will cause a certain ovalization thereof and the geometry of this friction ring needs to be dimensioned to generate two diametrically opposed radial forces when it becomes ovalized by 0.5 mm without generating high stresses thereon, so that it is able to withstand this level of stress without creep throughout the life of the product. A material of the PBT or POM type may be chosen for the ring because this friction piece needs to have very good resistance to wear and very good elasticity and also behave appropriately at the operating temperature in order to ensure a high level of stability of its clamping preload throughout the service life of the product.

The diametral clamping of this friction ring 72 on the barrel 221 will induce a stable and controlled friction torque that opposes the rotation of this ring with respect to the barrel 221 which is itself connected to the shell of the frame 1.

By way of example, very good operation is achieved by dimensioning the friction ring in such a way as to obtain two diametrically opposed radial forces at the friction bulges of around 5N under diametral clamping of 0.5 mm with a stress level of under 10 MPa on this ring, thus avoiding any risk of relaxation or creep over time, these radial forces generated on the 35 mm diameter barrel allow the generation of a friction torque of around 25 mN·m in both directions of rotation, which is perfectly adequate for engaging and disengaging the ratchet pawls while at the same time generating a torque that is low enough that it does not induce significant power losses when it slips, because this friction torque of 25 mN·m generates a loss of merely 0.2 watts at 80 revolutions per minute, which is negligible in comparison with the assistance power and means that the region of the bulges that is in contact with the barrel 221 is not heated up or worn away.

The transmission of torque between the ratchet wheel 65 and the shaft 4 passes via the torque transmission ring 44. This is the second mechanical connection of the torque transmission ring 44. In the first embodiment of the invention, this mechanical connection can easily be disconnected. The ring 44 comprises a splined portion 441 and a frustoconical portion 442, this frustoconical portion, with an angle of around 15° has enough of a taper to be reversible and easy to dismantle without the need for a puller, but not so tapered that it no longer provides good radial centering of the bottom bracket shaft under the modest axial load of the screw 46 used for preloading the assembly prior to the locking of the two screws 162. When the crankset is in place, the ring 44 is inside the ratchet wheel 65 with its splined portion 441 facing the internal splines 654 of the ratchet wheel 65. The torque transmission ring 44 then finds itself under the ball bearing 224.

The operation of the assistance device will now be described in detail.

In a first phase, the cyclist wishes to be assisted by the electric motor. They have switched on the assistance device and possibly chosen the level of assistance. The rotor of the motor will begin to turn in the positive direction. The output of the reduction gear will therefore drive, in the positive direction (the normal direction of pedaling identified with a + symbol in the figures) at a speed 46 times lower than the motor speed, the synchronizing ring 62 which will also drive in rotation in the same direction with it the friction ring 72; the friction of its two bulges 721 on the barrel of the cover 22 will generate a friction torque which will be transmitted to the synchronizing ring 62. Because the latter has a low amplitude of a relative rotation with respect to the drive ring 56, the friction torque will have the effect of forcing it in the opposite direction to the travel and therefore to rotate backwards relative to the output of the reduction gearbox. This relative rotation has a tendency to cause the ratchet pawls to pivot in their direction of engagement, causing the motor to be rotationally connected to the drive shaft 4. The free wheel is therefore engaging and the rotational coupling will occur very swiftly after the short transient coupling phase that will now be described, to ensure gentle and noiseless coupling, it is preferable to limit the motor current for a short moment on each resumption of assistance in order to ensure a gentle and noiseless coupling, to improve this coupling phase it is also preferable to reduce the angler pitch of the teeth 652 of the ratchet wheel 65, as may be seen in the section of FIG. 6, it is entirely possible to incorporate 32 teeth 652 on the ratchet wheel 65 which will make it possible to ensure a limited engagement pitch (11.25°) and therefore coupling that is flexible and rapid. Once coupled, the two ratchet pawls are correctly and stably engaged in the bottom of the teeth, which corresponds to state 1 of the free wheel 6, known as the assistance state or to the pedaling with assistance mode (phase 2) when the cyclist is not pedaling faster than the assistance supplied by the motor.

If the cyclist increases their pedaling frequency until it exceeds the output speed of the reduction gearbox (phase 3), the teeth 652 of the ratchet wheel 65 will lift the ratchet pawls 61 on the passing of each tooth, and no torque will be transmitted between the drive ring and the shaft 4. The free wheel therefore slips. This then is the conventional operation of a freewheel. It corresponds to state 2, referred to as the freewheeling state, of the freewheel 6. It may be noted that when the ratchet pawl is going to be lifted by a tooth 652 of the ratchet wheel 65, the synchronizing ring 62 and the friction ring 72 will then adopt a slight advance relative to the drive ring but the friction torque of the friction ring, which is brought about by the rubbing of the bulges 721 on the cover 22, will remain substantially constant, causing immediate reengagement of the ratchet pawls as soon as the tooth 652 has passed, and so in this freewheeling phase, the friction ring acts in a similar way to the return springs of conventional ratchet-type freewheels.

Now, if the cyclist decides to back-pedal (phase 5), the shaft 4 which is turning in the negative direction will, via the ratchet pawls, drive the drive ring 56 and the friction ring 72. The friction of the bulges 721 on the cover 221 generates a friction torque which opposes the rotation and causes the synchronizing ring to rotate relative to the drive ring until such point as the two ratchet pawls lift, making the coupling of the motor impossible. The freewheel is then in state 3, known as the disconnected state, as depicted in FIG. 10.

In fact, this disengagement of the ratchet pawls is associated with the direction of relative rotation between the annulus of the reduction gearbox and the cover of the bottom bracket shell (which is fixed), and so the engagement of the ratchet pawls can be controlled by controlling the direction of the rotation of the motor so that all that is required is to command the motor to rotate slightly in the backwards direction in order to cause the drive ring 56 to pivot by at least a few degrees backwards, which is to say in the negative direction, and thus disengage the free wheel.

In practice, if the cyclist is traveling forwards with assistance from the motor (phase 2), the ratchet pawls are then engaged. From this status, if the cyclist decides to travel backwards suddenly (phase 5) or stop pedaling in order to come to a halt (phase 4), because the ratchet pawls have engaging noses, it may be possible that the ratchet pawls will not be able easily to disengage despite the friction torque applied to the synchronizing ring, and for that reason it is desirable for a control microcontroller (not depicted) to be able to detect this event either via a pedaling-torque sensor (not depicted) which suddenly becomes zero or negative, or via a zero crankset rotational speed detected by an angular sensor (not depicted) or by a steep angular deceleration or else by a reversal of the direction of rotation of the motor or of the crankset and then order the motor to rotate backward with a backward acceleration greater than that of the cyclist or a fraction of a revolution, and this will disengage the ratchet pawls and allow them to lift, this backward operation can be halted almost immediately and the freewheel will then remain in the disengaged stable state without introducing the slightest friction or the slightest additional noise for the cyclist.

Finally, when the cyclist decides to dispense with the assistance or when the battery is exhausted (phase 1) the microcontroller will order the motor to rotate backward in order to place the freewheel in the disengaged state. Thus, the presence of the assistance device does not introduce any additional noise or friction.

The assistance device according to the invention is notably characterized in that the toothed chainrings 181, 182 which serve to transmit the torque from the pedals to the rear wheel of the bicycle rotate as one with the bottom bracket shaft 4, namely the spindle that bears the right crank 16 and left crank 16'. This configuration, which is the usual configuration for a bicycle without electrical assistance is almost never present in electrically assisted bicycles the assistance motor of which is positioned in the region of the crankset of the bike. In order to guarantee correct operation of the assistance device according to the invention, steps are taken to ensure that the electric motor transmits the assistance torque to the bottom bracket shaft. Of course, this transmission of torque is via a freewheel which, functionally speaking, is positioned between the output of the motor and the shaft 4. The transmission of torque from the motor to the bottom bracket shaft 4 uses a transmission ring 44 which is at least partially placed under one of the roller bearings used for mounting the bottom bracket shaft.

Advantageously, in the assistance device according to the invention, it is easy to dismantle the crankset without having to dismantle the entire assistance device. Indeed, in the specific case of the first embodiment, all that is required is to unscrew the nut 46, then the screws 162 in order to be able to remove the left crank 16'. A few taps with a mallet on the end of the shaft 4 allow the subassembly made up of the shaft 4, the chainwheels 161, 18 and the right crank 16 to be extracted. Thus, the first mechanical connection of the transmission ring 44 is disconnected from the ratchet wheel 65. The extracted subassembly is in the configuration depicted in FIG. 2, namely with the ring 44.

Figure 14:
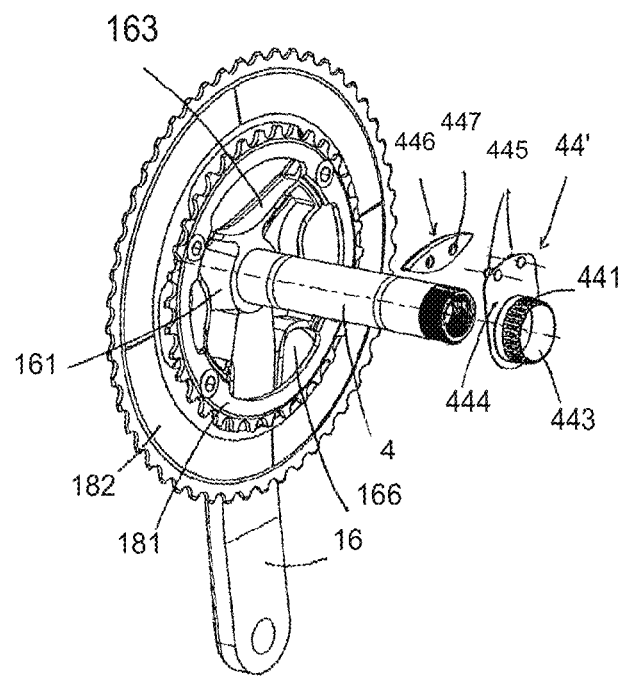
FIG. 14 is a partial perspective view of a variant of the first embodiment of the invention.
Figure 15:
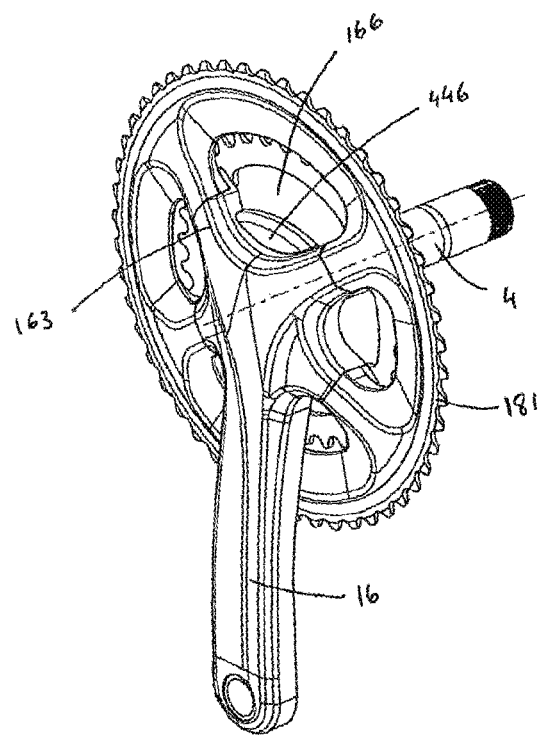
FIG. 15 is a perspective view from another angle than the view of FIG. 14.

FIGS. 14 and 15 describe a variant of the first embodiment of the invention.

Rather than having to bond the torque transmission ring 44', also referred to in this embodiment as splined ring 44', to the shaft 4, this ring is simply pivot-mounted on the shaft, with a very small amount of clearance, the transmission of torque being by virtue of a dog as will now be seen hereinbelow.

The splined ring 44' comprises a cylindrical portion 443, at the external surface of which there are formed splines 441 designed to collaborate with complementary splines 654 formed on the inside of the ratchet wheel 65 of the free wheel (cf. FIG. 3). When the crankset is assembled, the ring 44' is under the ball bearing 224.

The splined ring 44' also comprises a radial arm 444 perfectly secured to the cylindrical portion 443. As a preference, to reduce the axial bulk, the arm 444 takes the form of a plate. It may be fixed to the plate by any appropriate means, for example by welding or crimping. It is also conceivable to create the splined ring 44' as a single piece by machining.

Provided at the distal end of the radial arm are means for blocking the rotation of the ring 44' with respect to the right crank 16. These means notably comprise two studs 445 which project from the external face of the arm and an insert 446. The studs 445 are able to be inserted into two orifices 447, that have a shape that complements that of the studs and that are formed in the independent insert 446.

The insert 446 has an exterior shape specific to the crankset that is to be mounted in the assistance device according to the invention. In the embodiment described here, the right crank 16 forms, with a spider 161, to which the chainrings 181, 182 are screwed, just one single one-piece element. Recesses 166 are defined between the arms 163 of the spider 161.

FIG. 15 shows the insert 446 is able to be wedged and immobilized in the bottom of the recess 166. Thus, when the splined ring 44' is in place on the shaft 4 and the insert 446 is engaged over the studs 445 and wedged in the recess 166, all that is required is for the crankshaft to be inserted into the assistance device in order for assistance torque to be able to be transmitted to the chainwheels of the bottom bracket.

Of course, the insert could adopt as many exterior shapes as required to adapt to suit multiple cranksets. This then is one of the significant advantages of the invention; the possibility of fitting any standard crankset in the assistance device of the invention.

Furthermore, for a standard crankset in which the right crank and the spider are obtained by forging, it is possible to provide an insert of a shape such that it can be wedged into one of the cavities 166 only visible on the, normally hidden, internal face of the spider 161.

In this variant, the two mechanical connections provided by the ring 44' can easily be disconnected, the one that connects it to the ratchet wheel 65 by the splines and the one that connects it to the spider 161 of the right crank 16.

Figure 16:
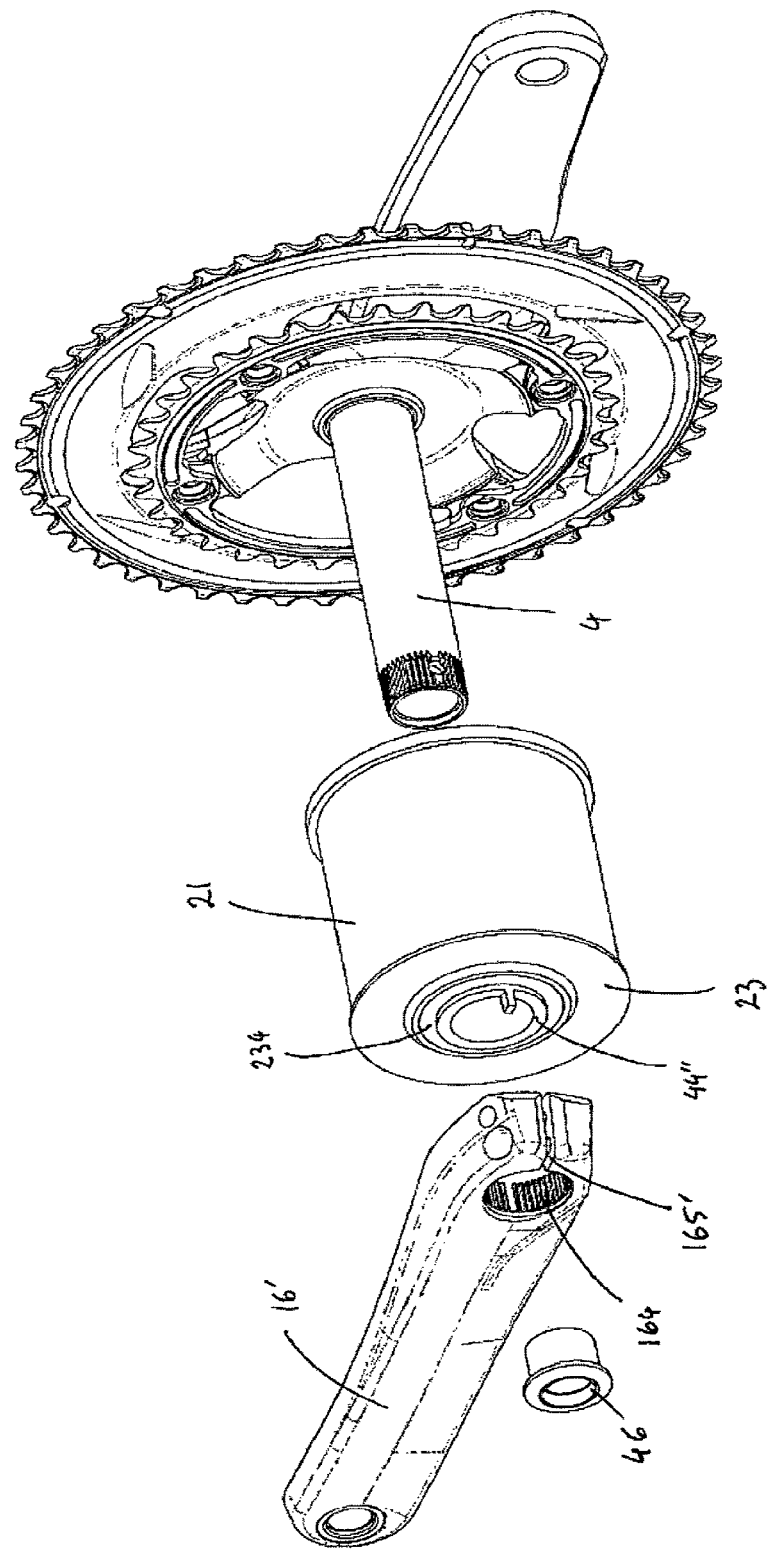
FIG. 16 is a perspective view of an assistance device according to a second embodiment of the invention.

FIG. 16 is a perspective depiction of the device according to a second embodiment of the invention. The assistance device comprises a casing 21 and a crankset. This device is intended to be housed in the bottom bracket shell of a bicycle. FIG. 15 shows the device prior to the assembly of the crankset with the rest of the device.

The casing 21 is closed on one side by the left cover 23 and on the other by the right cover 22. In this third embodiment, the ring 44" which performs the transmission of the assistance torque from the motor to the shaft 4 is no longer placed on the side of the right crank 16 but on the side of the left crank 16'. This ring is visible on the outside of the casing 21 because it is positioned under the ball bearing 234 formed in the left cover 23.

Figure 17:
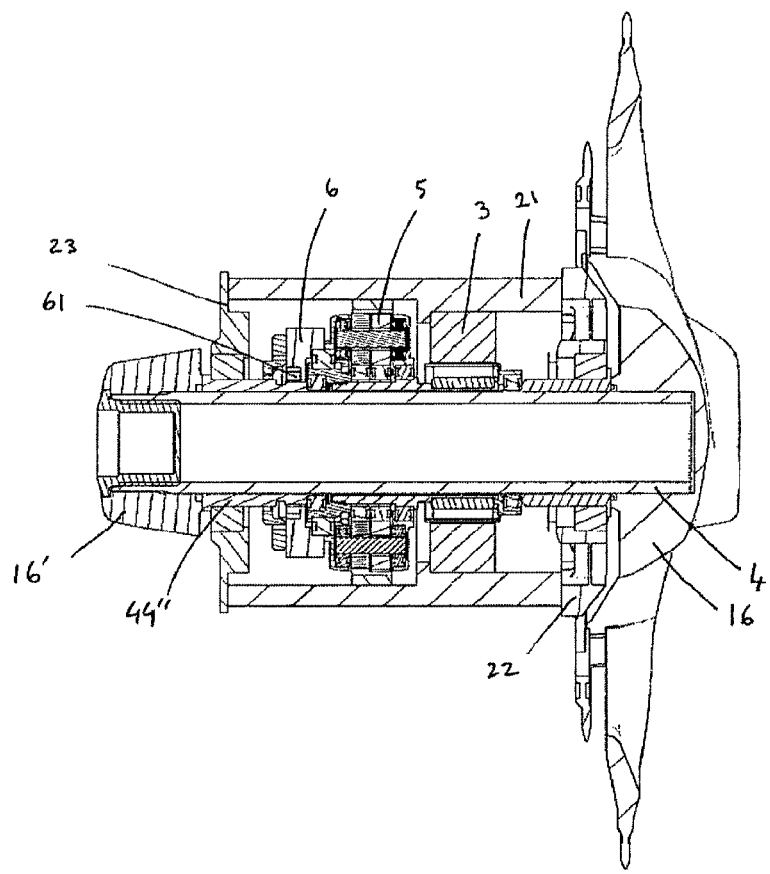
FIG. 17 is a view in longitudinal section of the device according to the second embodiment.

FIG. 17 is a depiction in longitudinal section of the entirety of the device. In a way similar to that described for the first embodiment, the device comprises a motor 3, a reduction gearbox 5, a freewheel 6 and measurement means 9.

Measurement means 9 notably comprise means formed on the right cover 22 and which allow the measurement of the forces to which the crankset is subjected. These measurement means are positioned in such a way that it is possible of measuring the mechanical power generated by the cyclist and the motor.

The motor 3 and one mechanical power transmission pathway are housed inside the casing 21. The mechanical power transmission pathway comprises a mechanical reduction gearbox 5 and a disengageable freewheel 6. At the end of the chain of the power transmission pathway there is the torque transmission ring 44". The latter comprises two portions.

Figure 18:
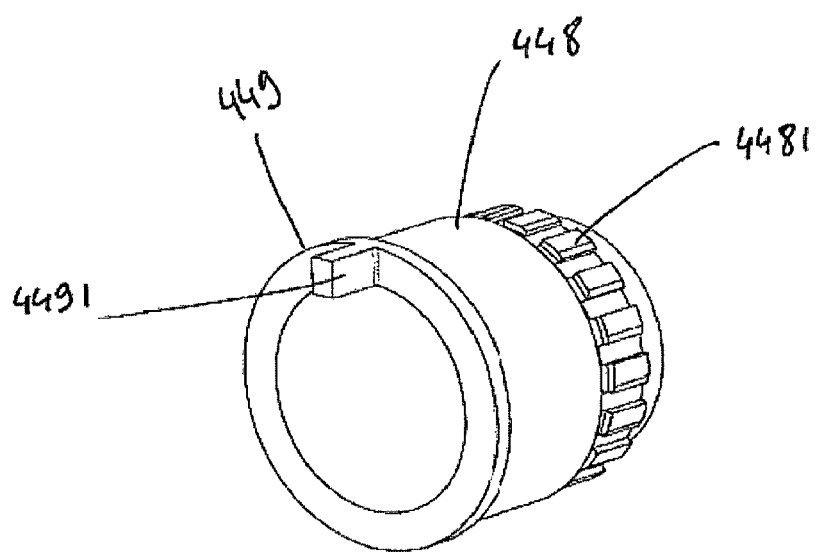
FIG. 18 is a perspective view of the transmission ring according to the second embodiment.

FIG. 18 is a perspective depiction of the torque transmission ring 44". The first portion 448 of the torque transmission ring comprises at its periphery a tooth set of which each of the teeth 4481 is able to come into contact with the ratchet pawls of the freewheel, thus providing a first mechanical connection with one of the components of the freewheel 6. In this case, the first mechanical connection in question is the ratchet pawls of the freewheel 61 coming into abutment against the teeth 4481. This first portion of the ring 44" acts as the ratchet wheel of the freewheel 6. In this embodiment of the invention, the first mechanical connection of the ring 44" is not readily disconnectable. Indeed, doing so would amount to dismantling the freewheel.

The second portion 449 of the torque transmission ring 44" comprises means for blocking the rotation of the ring 44" with respect to the left crank 16'. These means consist of a key 4491 projecting in the direction of the axis X from the frontal surface of the ring 44". When the assistance device is fully assembled and the crankset is in place, this key 4491 becomes housed in the clamping slot 165' of the left crank 16', thus providing a second mechanical connection of the transmission ring 44" with the left crank 16'. Because of the presence of the splines 164' on the crank 16' and the corresponding splines on the shaft 4, the transmission ring 44 makes the mechanical connection and transmits torque between the motor 3 and the shaft 4. The second mechanical connection is easily disconnectable. Indeed, it occurs as soon as the left crank 16' is removed.

According to the invention, the transmission ring 44" is under the left main ball bearing 234 of the bottom bracket shell, namely under the left cover 23. Thus, the function of transmitting power between the motor and the shaft can be "taken out of" the casing 21. In this case this is effectively what happens insofar as the key 4491 used for securing the motor 3 and the shaft 4 to ensure that they rotate as one is external to the casing 31 because it is placed in contact with the left crank 16'.

Advantageously, in the assistance device according to the invention, it is easy to dismantle the crankset without having to dismantle the entire assistance device. Specifically, in the specific case of the second embodiment, all that is required is to unscrew the nut 46, then the screws 162 in order to be able to remove the left crank 16'. Thus, the second mechanical connection of the transmission ring 44 is disconnected from the left crank 16'. A few taps with a mallet on the end of the shaft 4 allow the subassembly made up of the shaft 4, of the chainwheel 161, 18 and of the right crank 16 to be extracted. The extracted subassembly is in the configuration depicted in FIG. 16.

Figure 19:
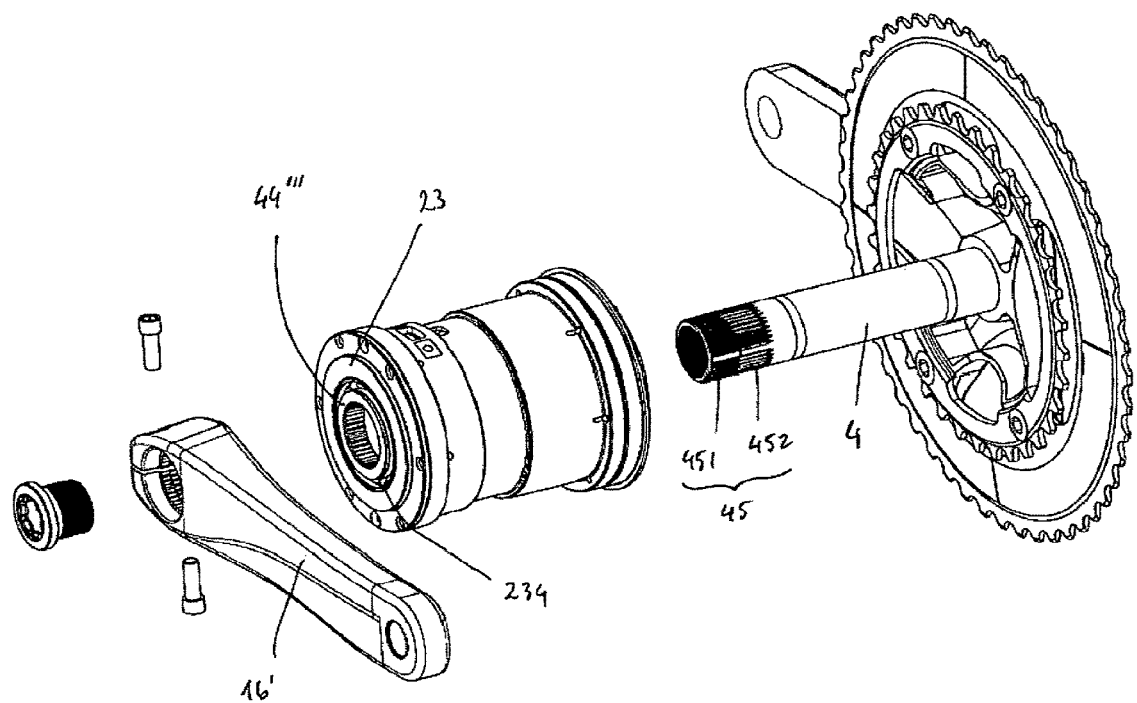
FIG. 19 is a perspective view of a variant of the second embodiment of the invention.
Figure 20:
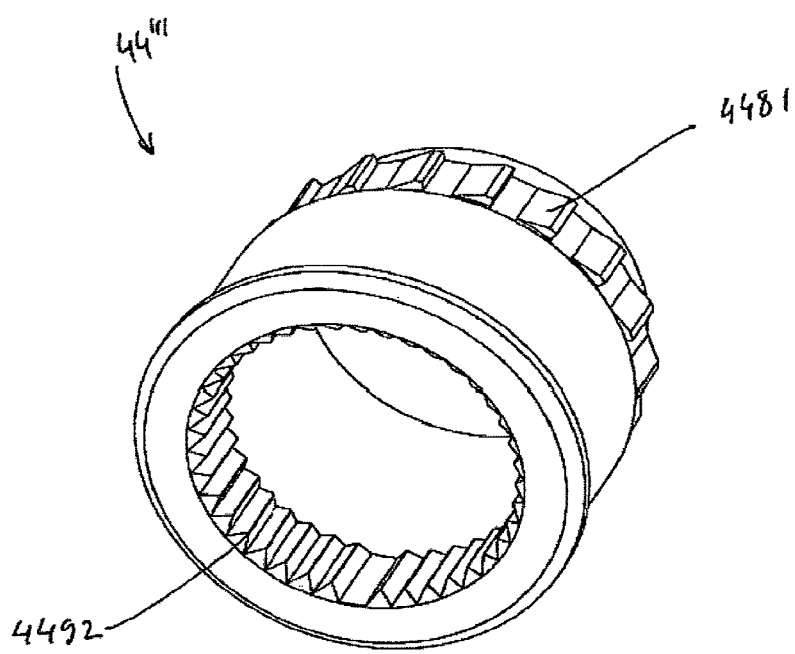
FIG. 20 is a perspective view of the transmission ring according to the variant of the second embodiment.

FIGS. 19 and 20 describe a variant of the second embodiment of the invention. This variant requires a special crankset that is specific in that it requires a certain length for the splines 45 which are generally formed at the end of the shaft 4 for transmitting torque between the left crank 16' and the shaft 4.

The splines 45 comprise two adjacent portions. The first portion 451 is the one used for transmitting torque between the left crank 16' and the shaft 4. The second portion 452 is used as a means for blocking rotation between the transmission ring 44''' and the shaft 4. As a preference, the splines of the first portion and those of the second portion are identical and are in fact just one and the same splined region, but longer than is usually found at the end of standard bottom bracket shafts. Specifically, the length of the splined region needs to be such that when the shaft is in place, the second portion 452 lies under the left ball bearing 234, which is placed at the level of the left cover 23.

The torque transmission ring 44''' performs a first mechanical connection with one of the components of the freewheel, namely the ratchet pawls 61. This mechanical connection is made by virtue of the teeth 4481 formed at the periphery of the ring 44'''. In fact, the ring 44''' acts as the freewheel ratchet wheel. The second mechanical connection performed by the ring 44''' is achieved by virtue of internal splines 4492 formed inside this ring. The internal splines 4492 collaborate with the second spline portion 452.

The invention is not restricted to the few embodiments and variants described here by way of example. Indeed, other embodiments are conceivable without departing from the scope of the invention. For example, only ratchet-type freewheels have been described, although it is possible to replace these with other types of freewheels such as friction-type freewheels.

The invention claimed is:
1. An assistance device for a bike comprising:
a motor;
a reduction gear;
a freewheel; and
a shaft rotating solidly with a right crank and a left crank,
said motor transmitting an assistance torque to the shaft via the freewheel,
said device being configured to be housed inside a bottom bracket shell,
said shaft being mounted with the ability to rotate relative to said shell by virtue of two ball bearings,
said freewheel being made up of several components which are placed between the motor and the shaft,
wherein the device further comprises a torque transmission ring enabling one of the components of the free wheel to be secured to the shaft or to one of the cranks,
wherein said transmission ring is at least partially placed under one of the two ball bearings,
wherein the torque transmission ring creates a first mechanical connection with one of the components of the free wheel and a second mechanical connection with the shaft or with one of the cranks,
wherein at least one of the two mechanical connections can be disconnected in such a way as to remove the shaft, and
wherein the transmission ring is positioned in the vicinity of the right crank and the disconnectable mechanical connection is the one between the ring and one of the components of the free wheel.

2. The device as claimed in claim 1, wherein the free wheel comprises at least one ratchet pawl configured to come into abutment on the teeth of a ratchet wheel and the ratchet wheel is configured to be secured to the transmission ring by splines.

3. The device as claimed in claim 2, wherein the transmission ring comprises a splined portion and a portion of frustoconical shape.

4. The device as claimed in claim 3, wherein the transmission ring is fixed to the shaft by bonding, shrink-fitting, or radial bind screws.

5. The device as claimed in claim 3, wherein the transmission ring comprises a cylindrical portion configured to surround the shaft and a radial arm extending from the cylindrical portion, said radial arm comprising means of blocking with the right crank.

6. The device as claimed in claim 1, wherein the shaft and the right crank constitute an independent subassembly that can be disassembled from the device without the need to remove the ball bearings of the device.

7. The device as claimed in claim 1, wherein the shaft has a diameter that is substantially constant over its entire length and in that the diameter of the shaft is less than or equal to an inside diameter of the ball bearing placed in the vicinity of the right crank.

8. An assistance device for a bike, comprising:
a motor;
a reduction gear;
a freewheel; and
a shaft rotating solidly with a right crank and a left crank,
said motor transmitting an assistance torque to the shaft via the freewheel,
said device being configured to be housed inside a bottom bracket shell,
said shaft being mounted with the ability to rotate relative to said shell by virtue of two ball bearings,
said freewheel being made up of several components which are placed between the motor and the shaft,
wherein the device further comprises a torque transmission ring enabling one of the components of the free wheel to be secured to the shaft or to one of the cranks,
wherein said transmission ring is at least partially placed under one of the two ball bearings, wherein the torque transmission ring creates a first mechanical connection with one of the components of the free wheel and a second mechanical connection with the shaft or with one of the cranks, and wherein at least one of the two mechanical connections can be disconnected in such a way as to remove the shaft, wherein the transmission ring is placed in the vicinity of the left crank and the disconnectable mechanical connection is the one between the ring and the shaft or the left crank, and wherein the transmission ring comprises a first portion comprising a tooth set of which each of the teeth is configured to come into contact with a ratchet pawl of the free wheel and a second portion comprising means for blocking the rotation with the left crank or with the shaft.

9. The device as claimed in claim 8, wherein the rotation blocking means comprise a key.

10. The device as claimed in claim 8, wherein the rotation blocking means comprise internal splines configured to collaborate with external splines formed on the shaft.

* * * * *